United States Patent
Mori et al.

(10) Patent No.: US 6,332,858 B1
(45) Date of Patent: Dec. 25, 2001

(54) TOROIDAL CONTINUOUSLY VARIABLE TRANSMISSION

(75) Inventors: Haruhito Mori, Kawasaki; Jun Sugihara, Yokosuka; Haruyoshi Kumura, Fujisawa; Toshikazu Oshidari, Yokosuka; Jun Watanabe, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/556,782

(22) Filed: Apr. 25, 2000

(30) Foreign Application Priority Data

| Apr. 30, 1999 | (JP) | 11-123619 |
| Dec. 17, 1999 | (JP) | 11-358438 |
| Dec. 17, 1999 | (JP) | 11-358439 |

(51) Int. Cl.⁷ ................................ F16H 15/38
(52) U.S. Cl. .................. 476/46; 476/8; 476/40; 476/42; 384/612
(58) Field of Search .................. 476/8, 10, 40, 476/42, 46

(56) References Cited

U.S. PATENT DOCUMENTS

| 3,486,391 | 12/1969 | Kraus . |
| 4,275,610 | 6/1981 | Kraus . |
| 5,299,987 | 4/1994 | Dawe ........................................ 476/10 |
| 5,536,091 | 7/1996 | Takata et al. ......................... 384/609 |
| 5,720,689 | * 2/1998 | Imanishi et al. ................... 476/46 X |
| 5,823,911 | * 10/1998 | Hibi ........................................ 476/40 |
| 5,830,103 | 11/1998 | Itoh et al. ................................ 476/8 |
| 6,238,318 | * 5/2001 | Itoh et al. ............................... 476/46 |

FOREIGN PATENT DOCUMENTS

| 6-129509 | 5/1994 | (JP) . |
| 7-198014 | 8/1995 | (JP) . |

* cited by examiner

Primary Examiner—Allan D. Herrmann
(74) Attorney, Agent, or Firm—Foley & Lardner

(57) ABSTRACT

A power roller (18C, 18D, 20C, 20D) of a toroidal continuously variable transmission is supported by a pedestal (94) such that it is free to rotate. A first roller bearing (96A) supporting the pedestal (94) in the trunnion (17) against a horizontal load which makes a right angle with an input shaft (16) of the transmission, and a second roller bearing (96B, 96C) supporting the pedestal (94) in the trunnion (17) against a vertical load which makes a right angle with the input shaft (16) of the transmission, are provided between the trunnion (17) and the pedestal (94). These roller bearings (96A), (96B), (96C) permit the pedestal (94) to easily displace parallel to the input shaft (16).

20 Claims, 20 Drawing Sheets

TOROIDAL CONTINUOUSLY VARIABLE TRANSMISSION

FIELD OF THE INVENTION

This invention relates to support of power rollers of a toroidal continuously variable transmission for vehicles.

BACKGROUND OF THE INVENTION

Tokkai Hei 6-129509 published by the Japanese Patent Office in 1994 discloses a toroidal continuously variable transmission of a dual cavity-half toroidal type for vehicles.

This transmission comprises a pair of toroidal units disposed on the same input shaft. In each unit, a pair of power rollers are gripped between an input disk and an output disk disposed facing each other on the input shaft. The input disk rotates together with the input shaft, and the power rollers gripped between the input disk and output disk transfer a torque to the output disk by friction. Each power roller is supported by trunnions via a pivot shaft. The trunnions comprise a trunnion shaft which makes a right angle with the input shaft.

If the trunnion is displaced in the direction of the trunnion shaft, the contact point of the power roller with each disk will change, and the direction of the force exerted by each disk on the power roller will vary. Due to the variation of this force, the power roller undergoes a rotational displacement together with the trunnion shaft, and as a result, the contact radius of either the input disk or output disk increases, and that of the other disk decreases.

The variation of these contact radii causes the speed ratio of the input disk and output disk, i.e., the speed ratio of the transmission, to vary.

Thus, the speed ratio of the transmission can be continuously varied by displacing a trunnion in the direction of the trunnion shaft. The rotation angle of the power roller supported on the trunnion shaft as fulcrum is referred to for example as the gyration angle of the power roller, and directly corresponds to the speed ratio of the continuously variable transmission.

SUMMARY OF THE INVENTION

The input disk is supported by the input shaft so that it can displace in an axial directions, and the power roller is pushed against the output disk by a powerful thrust generated by loading cams which are in contact with a rear surface of the input disk.

Due to this powerful thrust, the input disk and output disk undergo a deformation in an axial direction of the input shaft.

If the power roller is to follow the deformation to maintain contact with both disks, it must displace in the direction of the input shaft according to the deformation of the disks.

The reason why the power roller is supported by a pivot shaft joined to the trunnion so that it is free to oscillate, is to satisfy the above requirement. That is, displacement of the power roller in the direction of the input shaft is permitted by having the pivot shaft oscillate according to the deformation of the input disk and output disk in the axial direction. However, when the pivot shaft oscillates, the power roller displaces not only in a horizontal direction but also in a vertical direction.

Due to this displacement, the force which the input disk and output disk exert on the power roller varies in a complex manner, and is a factor which reduces the response of gyration angle variation of the power roller. Moreover, machining of the pivot shaft is difficult, and due to the complex support mechanism wherein the power roller is supported via the pivot shaft, the trunnions become larger and heavier.

Tokkai Hei 7-198014 which the Japanese Patent Office published in 1995 discloses a mechanism wherein the power roller is supported on a pedestal by ball bearings so as to be free to rotate, and a groove is formed in the trunnions in the direction of the input shaft, the pedestal being supported in this groove via roller bearings. The pedestal displaces only in the direction of the input shaft according to the external force applied to the power roller.

When torque is transmitted to the trunnion, a load acts on the trunnion in a direction perpendicular to the input shaft, and this load is supported by the wall surface of the groove in contact with the pedestal However, due to this force, a large frictional force acts between the wall surface of the groove and the pedestal when a pedestal displaces in the direction of the input shaft. This frictional force prevents the smooth displacement of the pedestal.

It is therefore an object of this invention to reduce the frictional resistance between the pedestal of a power roller which displaces along an input shaft and a trunnion.

In order to achieve the above object, this invention provides a toroidal continuously variable transmission comprising an input shaft, an input disk supported on the input shaft, an output disk supported relative to the input disk on the input shaft, a power roller gripped by the input disk and the output disk, a pedestal which supports the power roller such that the power roller is free to rotate, a trunnion, a first roller bearing which supports the pedestal on the trunnion relative to a horizontal load which forms a right angle to the input shaft, and permits the pedestal to undergo a displacement parallel to the input shaft, and a second roller bearing which supports the pedestal on the trunnion relative to a vertical load which forms a right angle to the input shaft, and permits the pedestal to undergo a displacement parallel to the input shaft.

This invention also provides a toroidal continuously variable transmission comprising an input shaft, an input disk supported on the input shaft, an output disk supported relative to the input disk on the input shaft, a power roller gripped by the input disk and the output disk, a pedestal which supports the power roller such that the power roller is free to rotate, a trunnion, and a roller bearing which supports the pedestal on the trunnion relative to a horizontal load which forms a right angle to the input shaft, and a vertical load which forms a right angle to the input shaft, and permits the pedestal to undergo a displacement parallel to the input shaft.

The details as well as other features and advantages of this invention are set forth in the remainder of the specification and are shown in the accompanying drawings.

DESCRIPTION OF THE PREFERRED EMBODIMENTS

Figure 1:
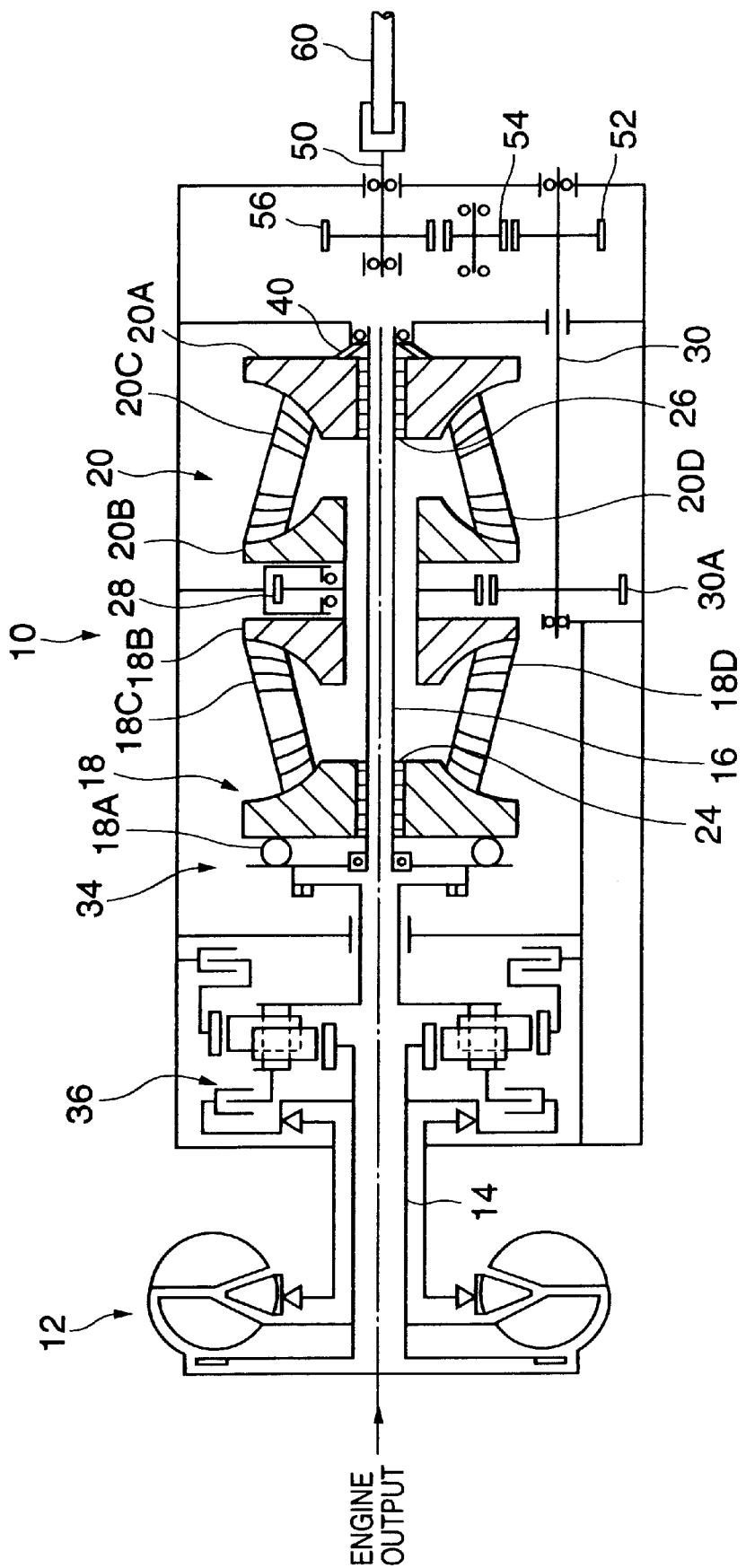
FIG. 1 is a schematic diagram of a toroidal continuously variable transmission to which this invention is applied.

Referring to FIG. 1 of the drawings, the rotation of an engine is input to an input shaft 16 of a toroidal continuously variable transmission (referred hereafter as CVT) 10 to which this invention is applied. The CVT 10 is a dual cavity-half toroidal type CVT, and comprises a first toroidal unit 18 and second toroidal unit 20.

The first toroidal unit 18 comprises a pair of input and output disks 18A, 18B disposed on an input shaft 1, and a pair of power rollers 18C, 18D gripped by these disks 18A, 18B. The second toroidal unit 20 comprises a pair of input and output disks 20A, 20B disposed on the input shaft 1, and a pair of power rollers 20C, 20D gripped by these disks 20A, 20B. The input disks 18A, 20A are joined to an input shaft 16 via ball splines 24, 26. Loading cams 34 which exert a thrust in an axial direction on the input disk 18A according to their rotation relative to the input disk 18A, are provided on the input shaft 16. The other input disk 20A is supported at one end of the input shaft 16 via a disk spring 40. Therefore, the thrust exerted by the loading cams 34 presses the input disk 18A against the output disk 18B, and presses the input disk 20A against the output disk 20B. Due to these pressing forces, the power rollers 18C, 18D are gripped by the input disk 18A and output disk 18B, and the power rollers 20C, 20D are gripped by the input disk 20A and output disk 20D.

The output disks 18B, 20B are spline-jointed to an output gear 28. The output gear 28 is supported free to rotate relative to the input shaft 16. The output gear 28 is meshed with a gear 30A fixed to an output shaft 30. The rotation of the output shaft 30 is transmitted to a propeller shaft 60 via gears 52, 54, 56 and a shaft 50.

Next, the supporting structure of the power roller 18C will be described referring to FIGS. 2 and 3. As all of the supporting structures of the power rollers 18C, 18D, 20C and 20D are the same, here only the power roller 18C will be described.

The power roller 18C is supported by a trunnion 17 through the circular pedestal 94. A shaft 94A which penetrates the power roller 18C projects from the center of the pedestal 94. The power roller 18C is supported by the pedestal 94 via a ball bearing 92. The power roller 18C is also supported by the shaft 94A via a roller bearing 89. A snap ring 86 is attached to the shaft 94A which penetrates the power roller 18C. The snap ring 86 prevents the power roller 18C and roller bearing 89 from falling out of the shaft 94A via a washer 87.

The trunnion 17 comprises a trunnion shaft 17A which extends in a vertical direction. Spherical joints 85A, 85B are respectively fixed above and below the power roller 18C on the trunnion shaft 17A. The spherical joint 85A is joined to corresponding spherical joints of the power rollers 18D, 20 and 20D via a link. The spherical joint 85B is also joined to corresponding spherical joints of the power rollers 18D, 20 and 20D via another link.

A horizontal groove 91 housing the pedestal 94 is formed in the trunnion 17. The groove 91 is formed by respective arc-shaped wall surfaces 91A, 91B corresponding to the shape of the pedestal 94.

The pedestal 94 is supported by a first roller bearing 96A, and second roller bearings 96B, 96C, inside the groove 91. The first roller bearing 96A is disposed between a bearing support plate 95 fixed to a base 91G of the groove 91, and the rear surface of the pedestal 94. The second roller bearing 96B is disposed between the upper end of the pedestal 94, and the wall surface 91A at the top of the groove 91. The second roller bearing 96C is disposed between the lower end of the pedestal 94, and the wall surface 91B at the bottom of the groove 91.

An adjusting shim 97 is disposed between the wall surface 91A and the first roller bearing 96A in order to provide a flat rolling surface for the roller bearing 96A as well as to prevent looseness of the pedestal 94. An identical adjusting shim 97 is disposed also between the wall surface 91B and second roller bearing 96B.

Figure 3:
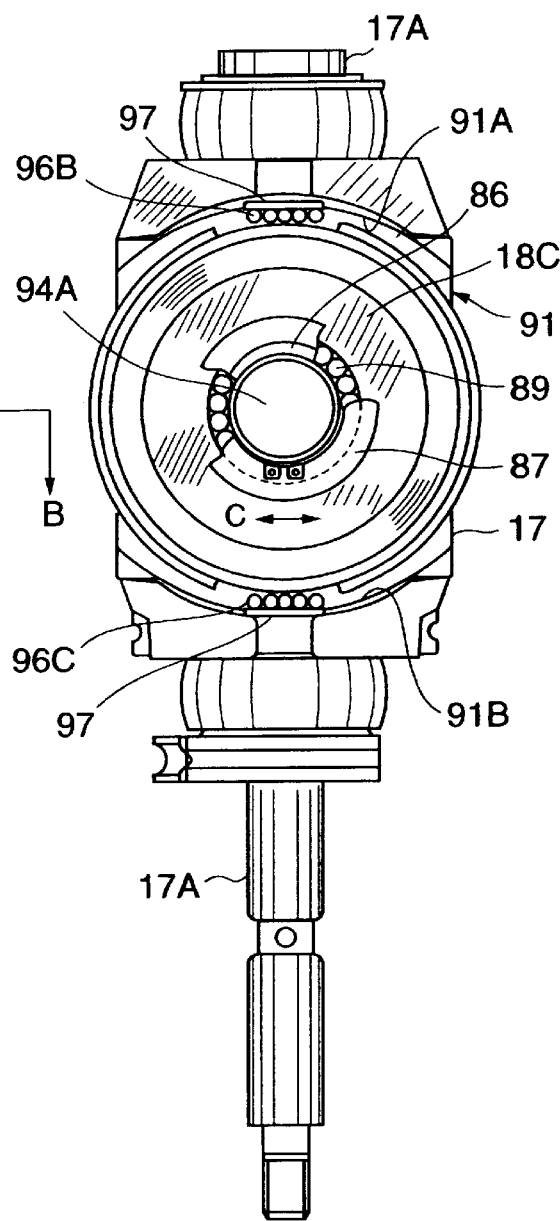
FIG. 3 is a front view of a trunnion and a power roller including a partial front view of roller bearings according to this invention.

Due to these bearings 96A, 96B, 96C, the pedestal 94 is able to slide together with the power roller 18C parallel to the input shaft 16, i.e., in the direction shown by the horizontal arrow C in FIG. 3, to the extent that it does not interfere with the arc-shaped wall surfaces 91A, 91B.

A lubricating oil feed passage 98 is provided in the trunnion 17, and an opening 98A of the lubricating oil feed passage 98 is formed in the base 91G of the groove 91 facing the pedestal 94. On the other hand, an oil passage 99 which supplies lubricating oil to the ball bearing 92 and the roller bearing 89 is formed in the center of the shaft 94A.

One end of the oil passage 99 faces the opening 98A, and opens onto the rear face of the shaft 94A relative to the opening 98A. The other end of the oil passage 99 opens onto the outer circumference of the shaft 94A after a 90 degree bend.

Therefore, lubricating oil from the lubricating oil feed passage 98 is supplied through the opening 98A and a gap formed between the trunnion 17 and pedestal 94 in the groove 91, and to the ball bearing 92 and roller bearing 89 via the oil passage 99.

Figure 2:
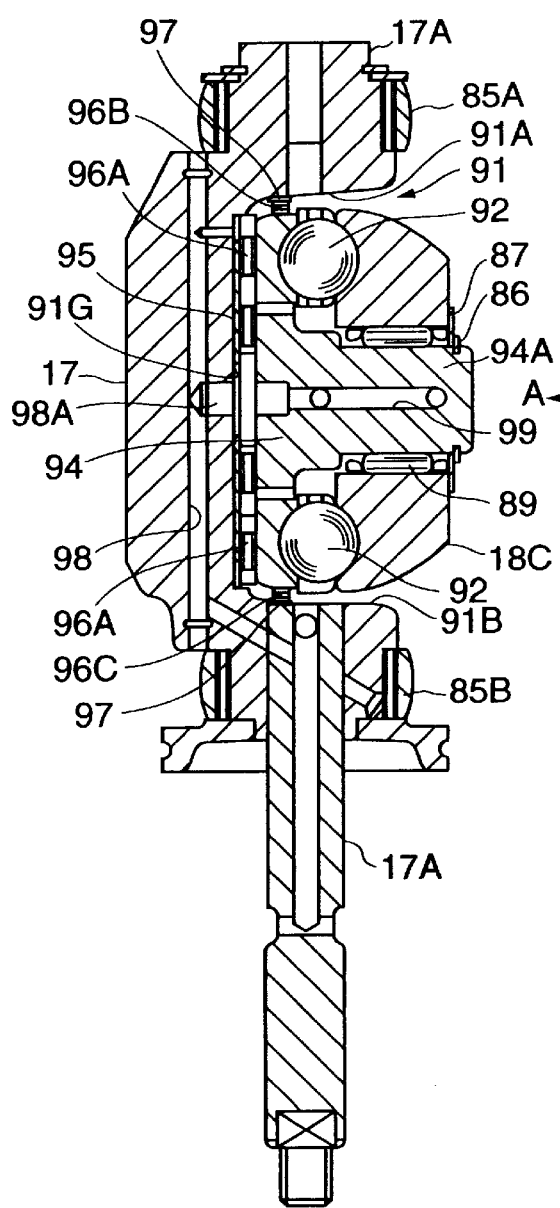
FIG. 2 is a longitudinal sectional view of a trunnion and a power roller according to this invention.

A force A shown by the horizontal arrow in FIG. 2 and a force B shown by the vertical arrow in the figure acts on the power roller 18C together with transmission of torque from the input disk 18A to the output disk 18B. The horizontal force A is supported by the base 91G of the groove 91 via the ball bearing 92, the pedestal 94, and the first roller bearing 96A. The vertical force B is supported by the lower wall surface 91B of the groove 91 via the roller bearing 89, the shaft 94A, the pedestal 94 and the second roller bearing 96C. When the engine is in the braking state, torque is transmitted to the input disk 18A from the output disk 18B, and a force acts on the power roller 18C in an opposite direction to the vertical force B. This force is supported by the upper wall surface 91A of the groove 91 via the roller bearing 89, the shaft 94A, the pedestal 94 and the second roller bearing 96B.

The CVT 10 varies the direction of the force which the input disk 18A and output disk 18B exert on the power roller 18C by driving the trunnion shaft 17A in an axial direction by oil pressure, and thereby varies the gyration angle by causing the power roller 18C to perform a rotational displacement together with the trunnion 17 about the trunnion shaft 17A as center.

Due to the displacement of the trunnion shaft 17A in the axial direction, when the contact point of the input disk 18A and output disk 18B with the power roller 18C displaces, the action point of the force exerted by the power roller 18C on these disks varies, and as a result, the deformation amount of the input disk 18A and output disk 18B in the direction of the input shaft 16 varies. Due to this variation, in addition to the horizontal load A in the direction of the shaft 94A and vertical load B shown in FIG. 2, a force shown by a horizontal arrow C in FIG. 3 also acts on the power roller 18C.

As the pedestal 94 supported by the first roller bearing 96A, and second roller bearings 96B and 96C, is free to displace within a range permitted by the upper limiting wall surfaces 91A, 91B, this horizontal force is dissipated, and the power roller 18C displaces so as to follow the deformation of the disks 18A, 18B. By providing the second roller bearings 96B, 96C, the frictional resistance between the pedestal 94 and the wall surfaces 91A, 91B is suppressed very small.

Thus, by improving the ability of the power roller 18C to follow the deformation of the input disk 18A and output disk 18B, the response of gyration angle variation improves. Moreover, as the horizontal force C does not act on the trunnion 17 at all, the structural stability of the trunnion 17 also improves.

Figure 4:
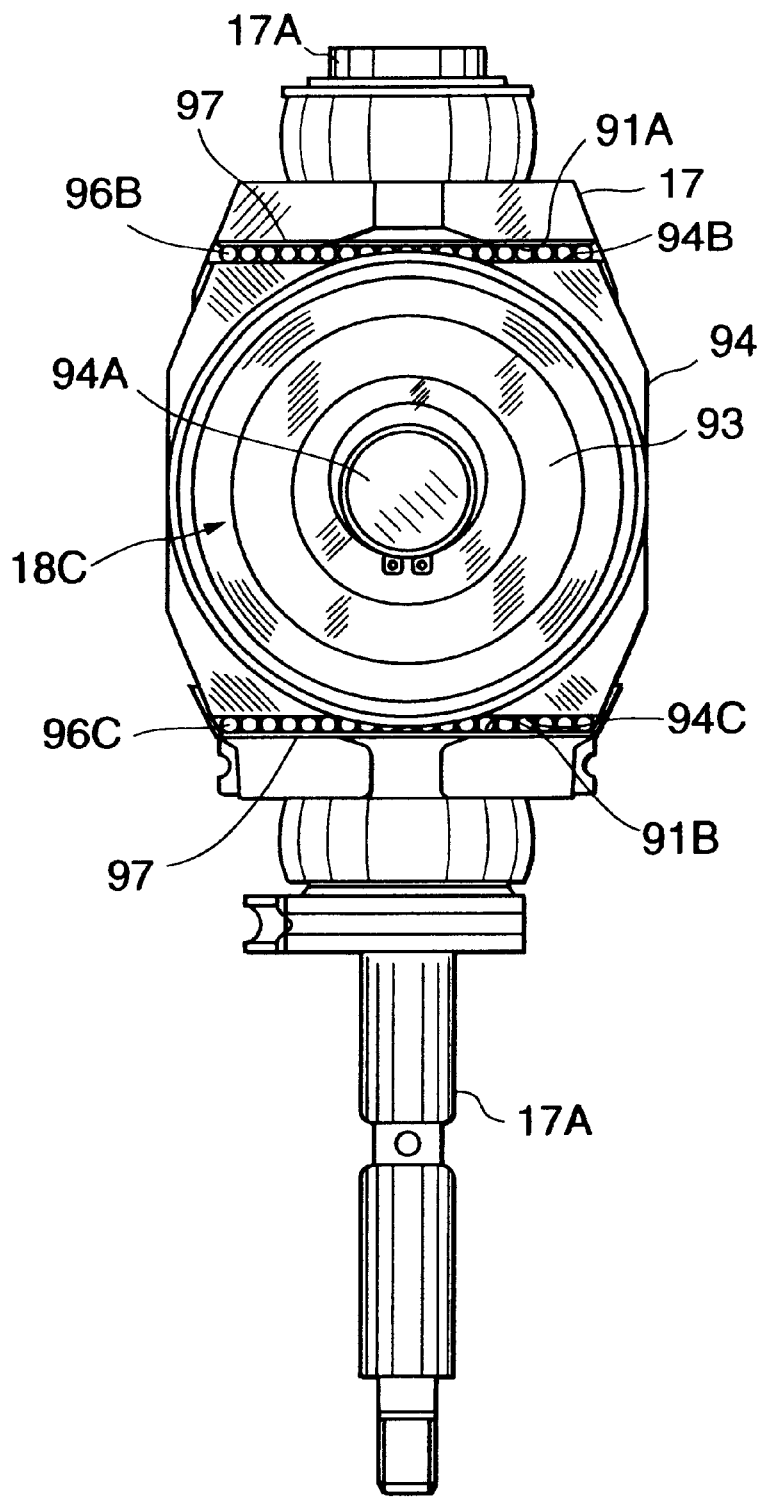
FIG. 4 is similar to FIG. 3, but showing a second embodiment of this invention.

Next, a second embodiment of this invention will be described referring to FIG. 4.

In this embodiment, instead of making the pedestal 94 circular, it is made polygonal with respectively a horizontal flat part 94B on its upper surface and a horizontal flat part 94C on its lower surface. Correspondingly, the wall surfaces 91A, 91B of the groove 91 are also formed in this shape. By forming the pedestal 94 and groove 91 in such a shape, the number of rollers of the second roller bearings 96B and 96C may be increased so that the force supporting the vertical load acting on the pedestal 94 is increased.

Figures 5, 6:
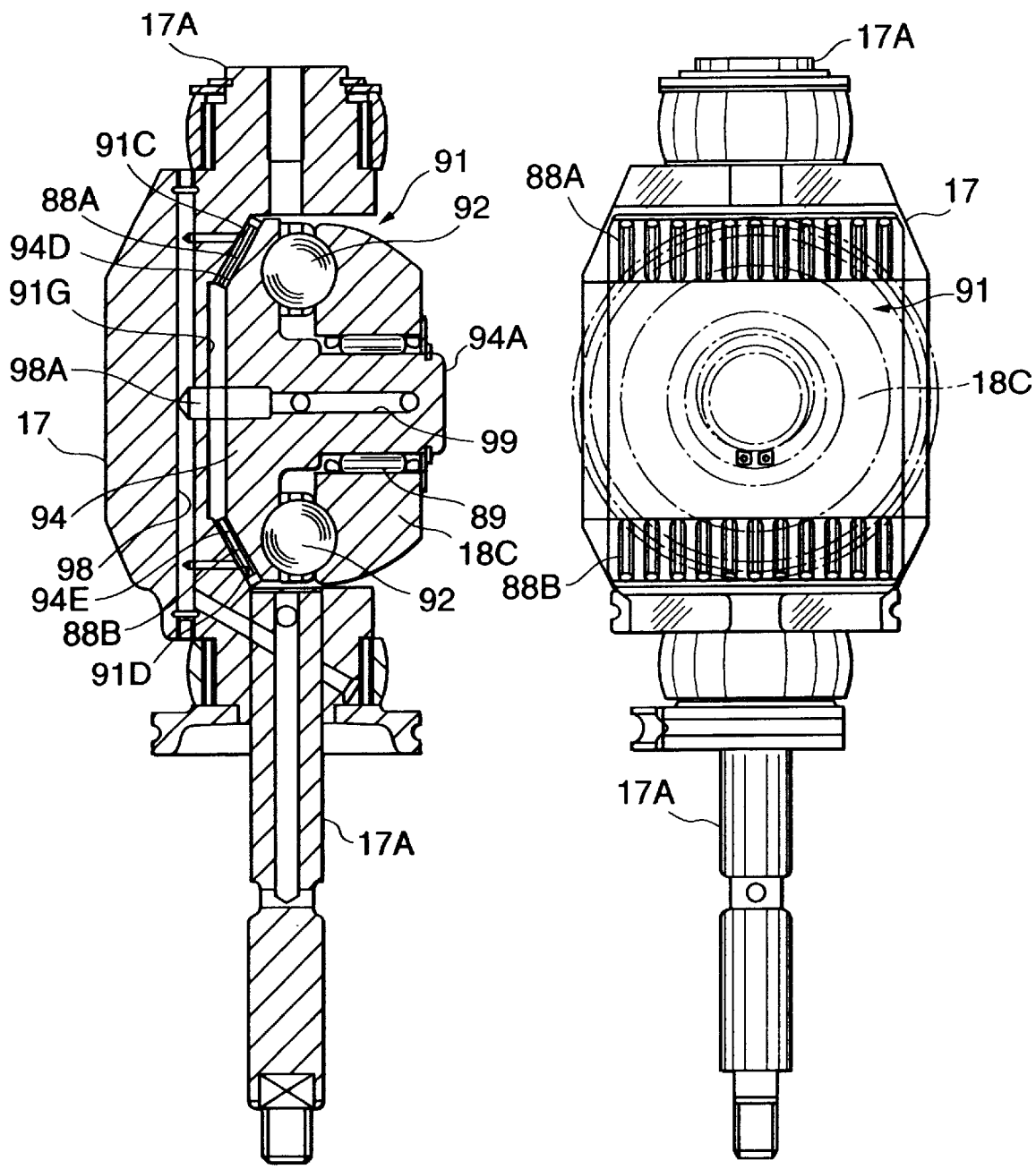
FIG. 5 is similar to FIG. 2, but showing a third embodiment of this invention.
FIG. 6 is similar to FIG. 3, but showing the third embodiment of this invention.

Next, a third embodiment of this invention will be described referring to FIGS. 5 and 6.

In this embodiment, slant faces 94D, 94E are formed above and below the rear part of the pedestal 94 having a circular shape as in the first embodiment, and correspondingly, slant faces 91C, 91D are formed above and below the base 91G of the groove 91.

A roller bearing 88A is disposed between the slant face 94D and slant face 91C, and a roller bearing 88B is disposed between the slant face 94E and slant face 91D. In this embodiment, the horizontal load acting on the power roller 18C parallel to the rotating shaft 64A is supported by the upper and lower roller bearings 88A, 88B. The load acting in an upward direction on the power roller 18C is also supported by the upper roller bearing 88A, and the load acting in a downward direction on the power roller 18C is supported by the lower roller bearing 88B. Therefore, even when a force in the direction of the input shaft 16, i.e., a force in the left-right direction of FIG. 6, acts on the power roller 18C in addition to the load acting in the vertical direction, the pedestal 94 displaces horizontally relative to the trunnion 17 without resistance. Hence, the same desirable effect is obtained as in the first and second embodiments.

In addition, in this embodiment, there are few kinds of roller bearing, and as the adjusting shim 97 is unnecessary, the number of parts required to support the power roller 18C can be reduced. The action point of the load exerted by the pedestal 94 on the trunnion 17 is also distributed between the upper part and lower part, so the deformation of the trunnion 17 supporting the power roller 18C also decreases.

Figure 7:
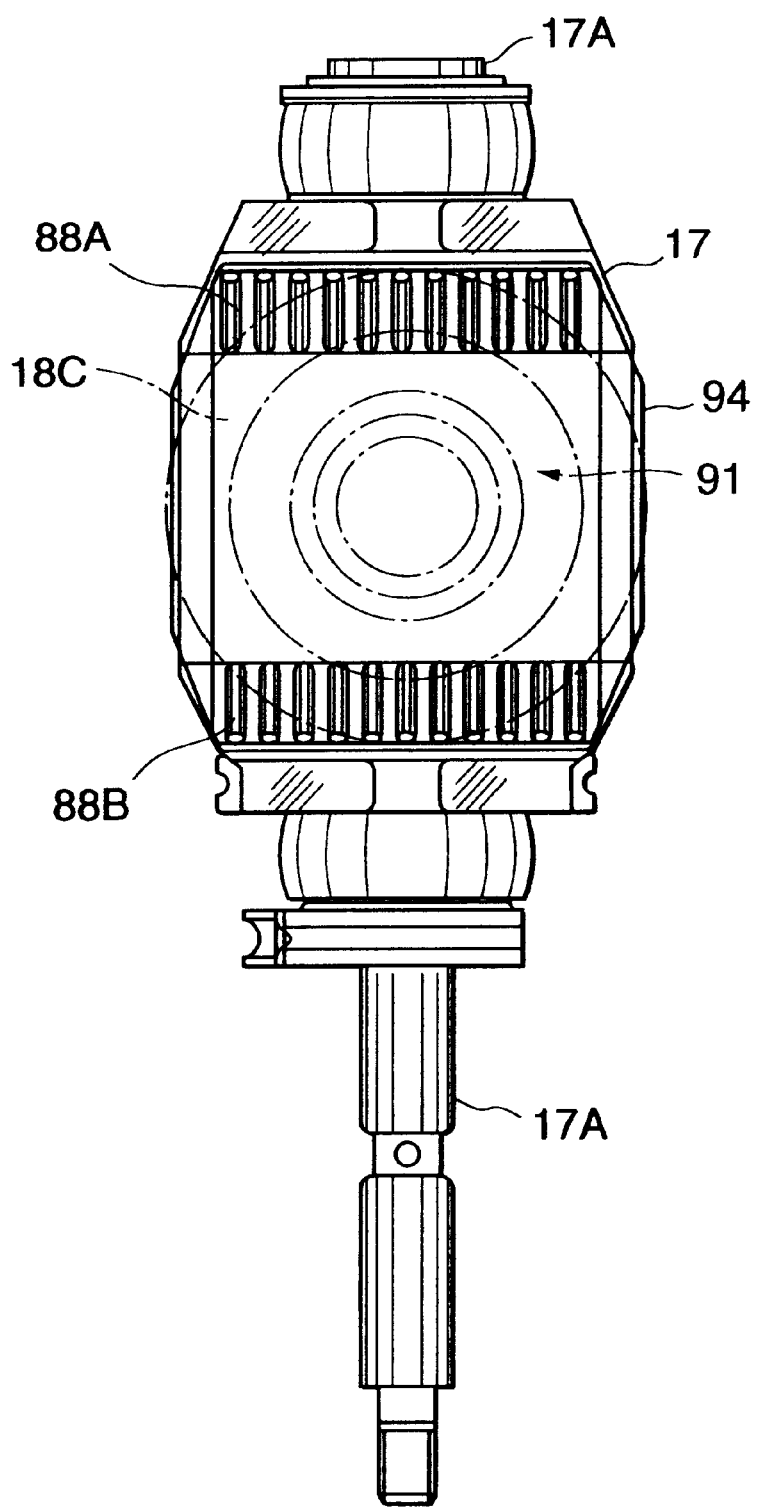
FIG. 7 is similar to FIG. 3, but showing a fourth embodiment of this invention.

Next, a fourth embodiment of this invention will be described referring to FIG. 7.

In this embodiment, instead of making the pedestal 94 of the third embodiment circular, it is given a polygonal shape as in the second embodiment. The remaining features of the construction are the same as those of the third embodiment.

According to this embodiment, in addition to the effect of the third embodiment, since the shape of the slant faces 94D, 94E is trapezoidal, the contact area of the roller bearings 88A, 88B with the pedestal 94 increases, so the supporting structure of the pedestal 94 is further stabilized.

Figure 8:
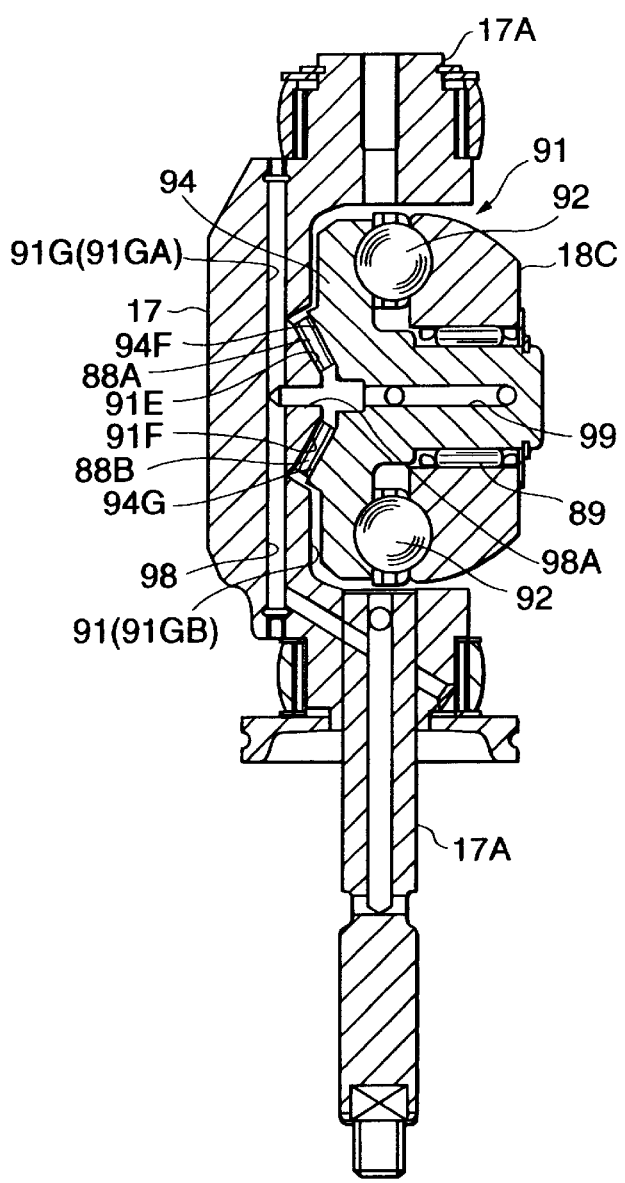
FIG. 8 is similar to FIG. 2, but showing a fifth embodiment of this invention.
Figure 9:
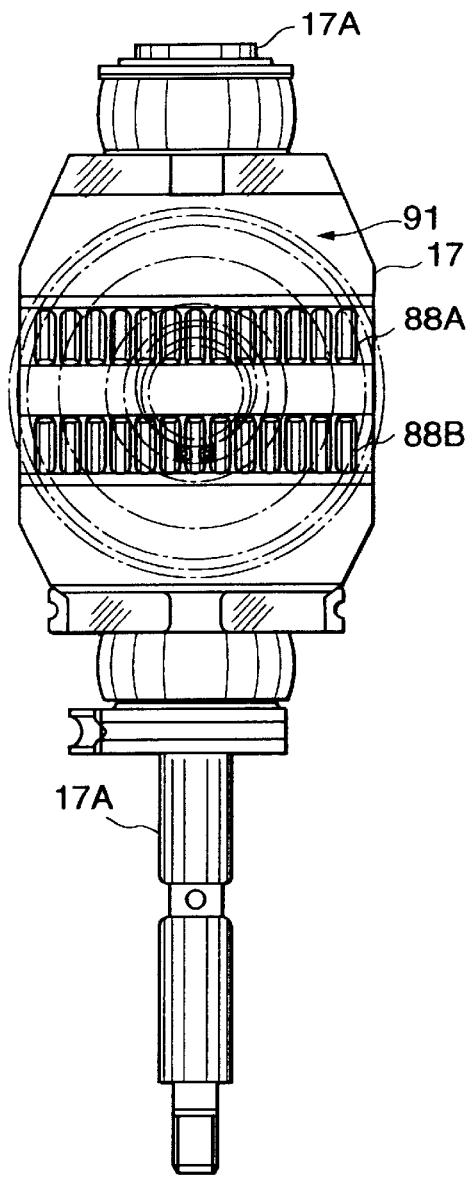
FIG. 9 is similar to FIG. 3, but showing the fifth embodiment of this invention.

Next, a fifth embodiment of this invention will be described referring to FIGS. 8 and 9.

In this embodiment, slant faces 94F, 94G in the reverse direction are formed near the center of the pedestal 94 such that they form a groove of trapezoidal cross-section instead of the slant faces 94D, 94E of the pedestal 94 of the third embodiment, slant faces 91 E, 91F are correspondingly formed in the center of the groove 91, the roller bearing 88A is disposed between the slant face 94F and slant face 91E, and the roller bearing 88B is disposed between the slant face 94G and slant face 91F.

Due to these slant faces 94F, 94G, the base 91G of the groove 91 is partitioned into an upper base 91GA and a lower base 91GB.

In this embodiment, the horizontal load acting on the power roller 18C parallel to the rotating shaft 64A is supported by the upper and lower roller bearings 88A, 88B.

Also, the upward vertical load acting on the power roller 18C is supported by the lower roller bearing 88B, and the downward vertical load acting on the power roller 18C is supported by the upper roller bearing 88A.

Therefore, even when the power roller 18C is subject to a load in the direction of the input shaft 16 in addition to a load in the vertical direction, the pedestal 94 displaces horizontally without resistance relative to the trunnion 17.

Further, as the roller bearings 88A, 88B are symmetrically disposed near the shaft 94A, the thickness of the pedestal 94 supporting the ball bearing 92 can be increased, and the supporting force of the pedestal 94 relative to the ball bearing 92 is improved.

Figure 10:
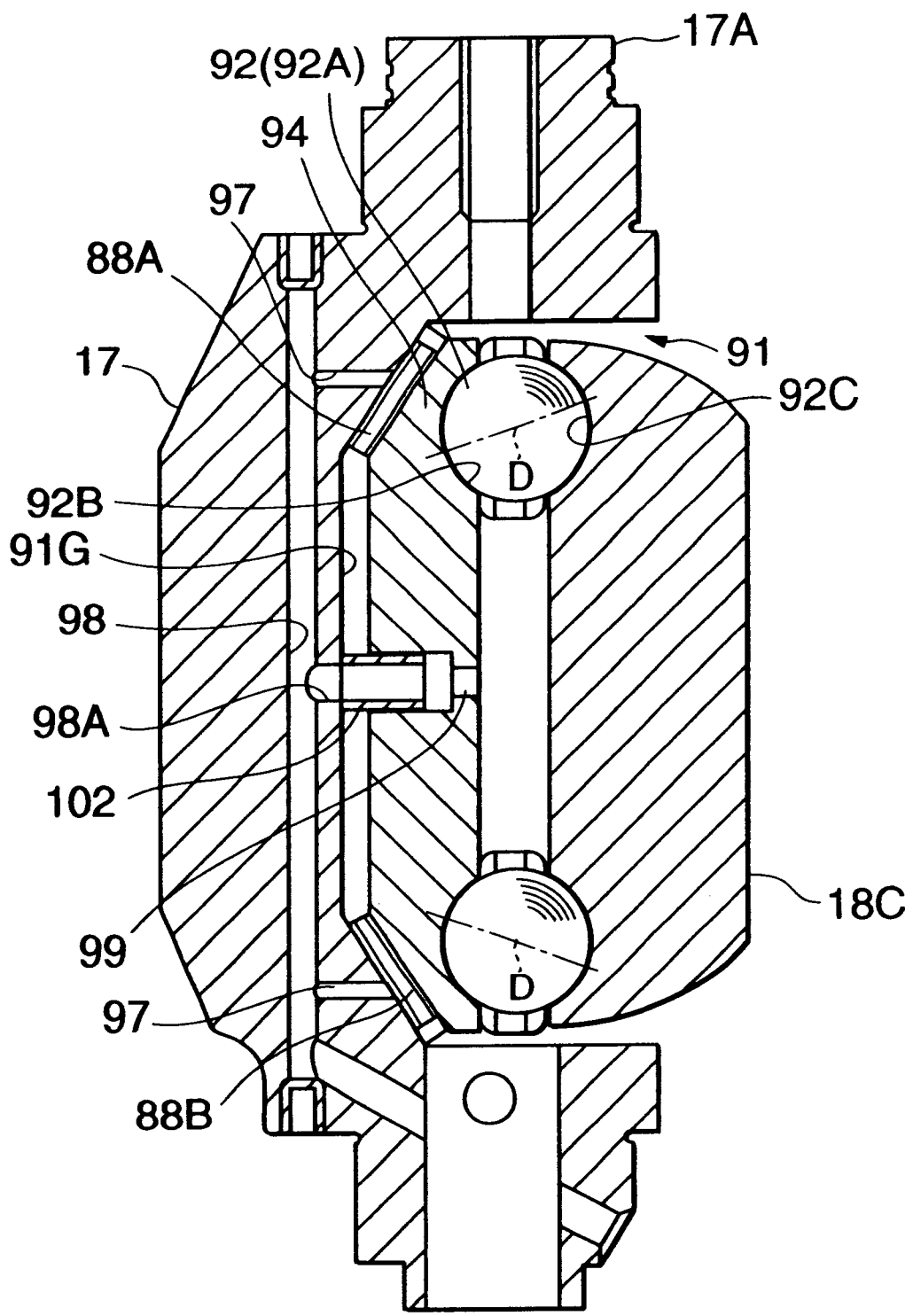
FIG. 10 is an enlarged longitudinal sectional view of the essential parts of a power roller and a trunnion according to a sixth embodiment of this invention.

Next, a sixth embodiment of this invention will be described referring to FIG. 10.

This embodiment comprises roller bearings 88A, 88B which are disposed as in the third embodiment. On the other hand, unlike the case of the first-fifth embodiments, the pedestal 94 does not have the shaft 94A, and supports the power roller 18C only by the ball bearing 92. As the pedestal 94 does not have the shaft 94A, the power roller 18C does not have a hole through which the shaft 94A penetrates.

The ball bearing 92 has the following construction in order to support the horizontal and vertical loads in the figure which are applied to the power roller 18C.

The ball bearing 92 comprises plural spheres 92A, an annular groove 92B formed in the pedestal 94 and an annular groove 92C formed in the power roller 18C. Herein, the cross-sectional shapes of the annular grooves 92B and 92C are set so that the radius of the locus of the contact point of the annular groove 92B with the spheres 92A from the center of the power roller 18C is less than the radius of the locus of the contact point of the annular groove 92C with the spheres 92A from the center of the power roller 18C.

Consequently, as shown in the figure, a line D which joins the contact point of the annular groove 92B with the spheres 92A, and the contact point of the annular groove 92C with the spheres 92A, is oriented in an oblique direction. The setting of the cross-sectional shapes of the annular grooves 92B, 92C are known from Tokkai Hei 9-126288 published by the Japanese Patent Office in 1997.

The oil passage 99 which passes through the pedestal 94 in the horizontal direction of the figure is formed in the center of the pedestal 94. Lubricating oil in the lubricating feed passage 98 formed in the trunnion 17 is led from the opening 98A via a sleeve 102 and oil passage 99 into the gap between the pedestal 94 and the power roller 18C, and is used for lubricating the ball bearing 92. The sleeve 102 suppresses outflow of lubricating oil in the lubricating oil feed passage 98 into the gap between the trunnion 17 and pedestal 94, so that effectively all the lubricating oil in the lubricating oil passage 99 passes along the center of the shaft 94A. Supply of lubricating oil to the roller bearings 88A, 88B is performed via independent oil passages 97.

According also to this embodiment, when a load in the horizontal direction and a load in the vertical direction simultaneously act on the power roller 18C, the roller bearings 88A, 88B, displace the pedestal 94 horizontally without resistance so the power roller 18C has good follow-up characteristics relative to deformation of the input disk 18A and output disk 18B, as in the third embodiment.

Figure 11:
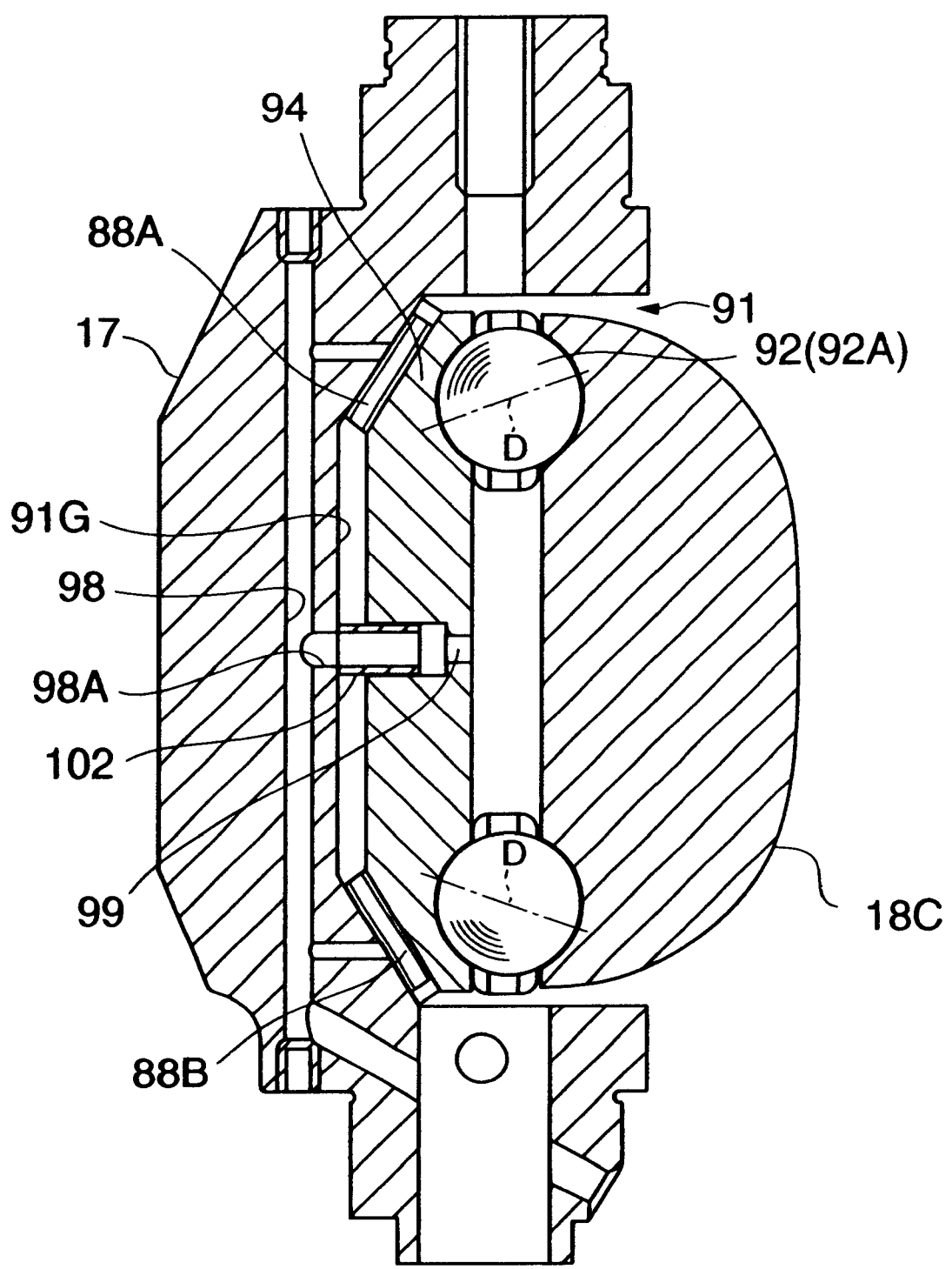
FIG. 11 is similar to FIG. 10, but showing a different design of the power roller of the sixth embodiment.

Also, as the shape of the power roller 18C and pedestal 94 of the power roller 18C are simple, the rigidity of the power roller 18C is increased correspondingly. Further, the snap ring 86 and washer 87 which prevent the roller bearing 89 and power roller 18C from falling out of the shaft 94A, are unnecessary. Therefore, according to this embodiment, the number of parts required to support the power roller 18C can be reduced. In addition, in the first to fifth embodiments, a flat surface which comes in contact with the snap ring 86 and washer 87 had to be provided to the power roller 18C, but according to this embodiment, the snap ring 86 and washer 87 are unnecessary. Therefore, the thickness of the power roller 18C can be increased and the area of the spherical surface in contact with the input disk 18A and output disk 18B can be enlarged as shown in FIG. 11. This design increases the rigidity of the power roller 18C and suppresses deformation of the power roller 18C due to pressure from the disks. As a result, the durability of the ball bearing 92 is also improved.

Figure 12:
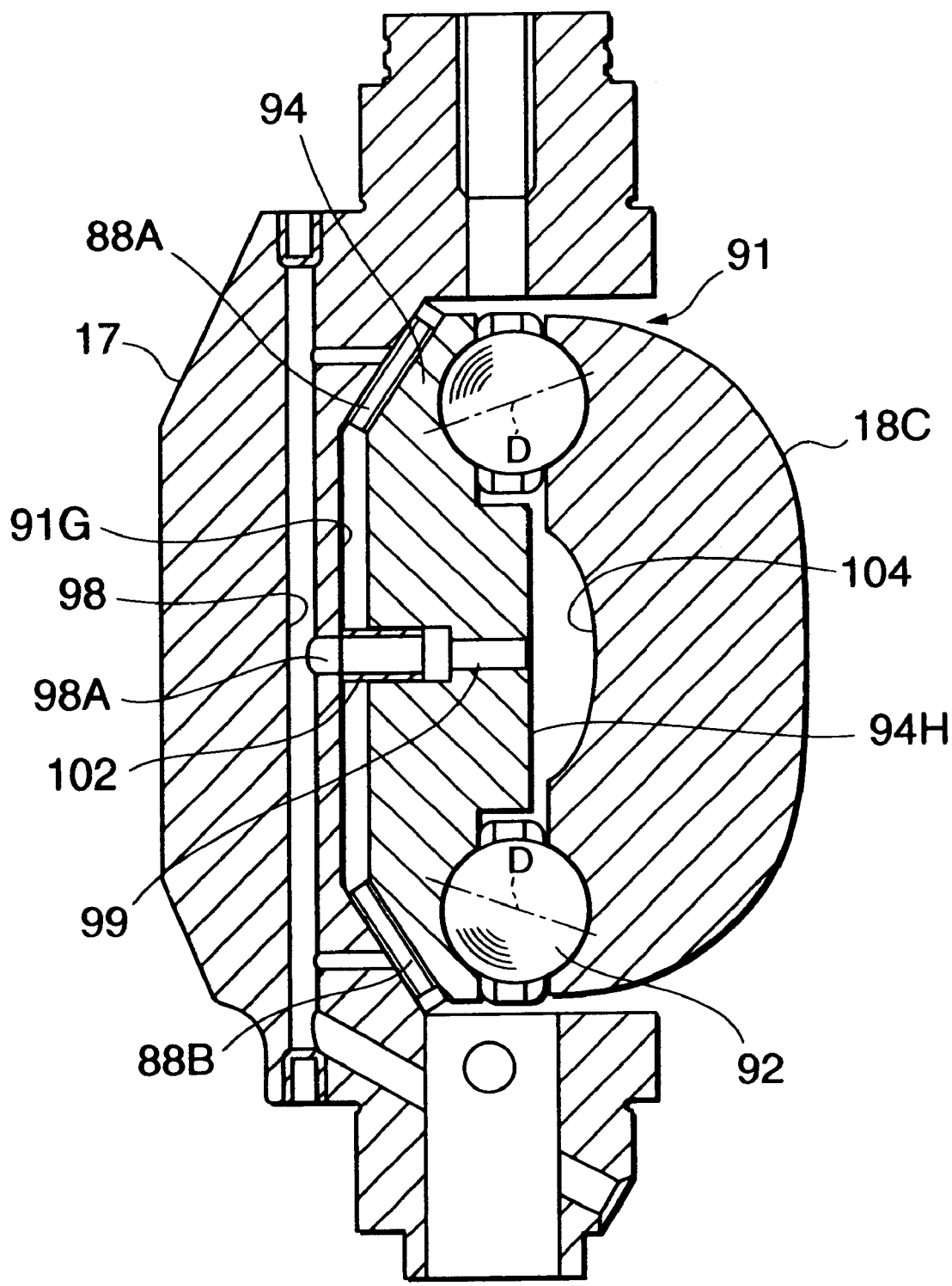
FIG. 12 is similar to FIG. 10, but showing a seventh embodiment of this invention.

Next, a seventh embodiment of this invention will be described referring to FIG. 12.

According to this embodiment, a depression 104 is formed on the rear surface of the power roller 18C, and correspondingly, a center part 94H of the pedestal 94 projects toward the depression 104. The remaining features of the construction are identical to those of the sixth embodiment. The space between the center part 94H and the depression 104 acts as a reservoir for lubricating oil which is supplied from the lubricating passage 99 to the ball bearing 92.

Figure 13:
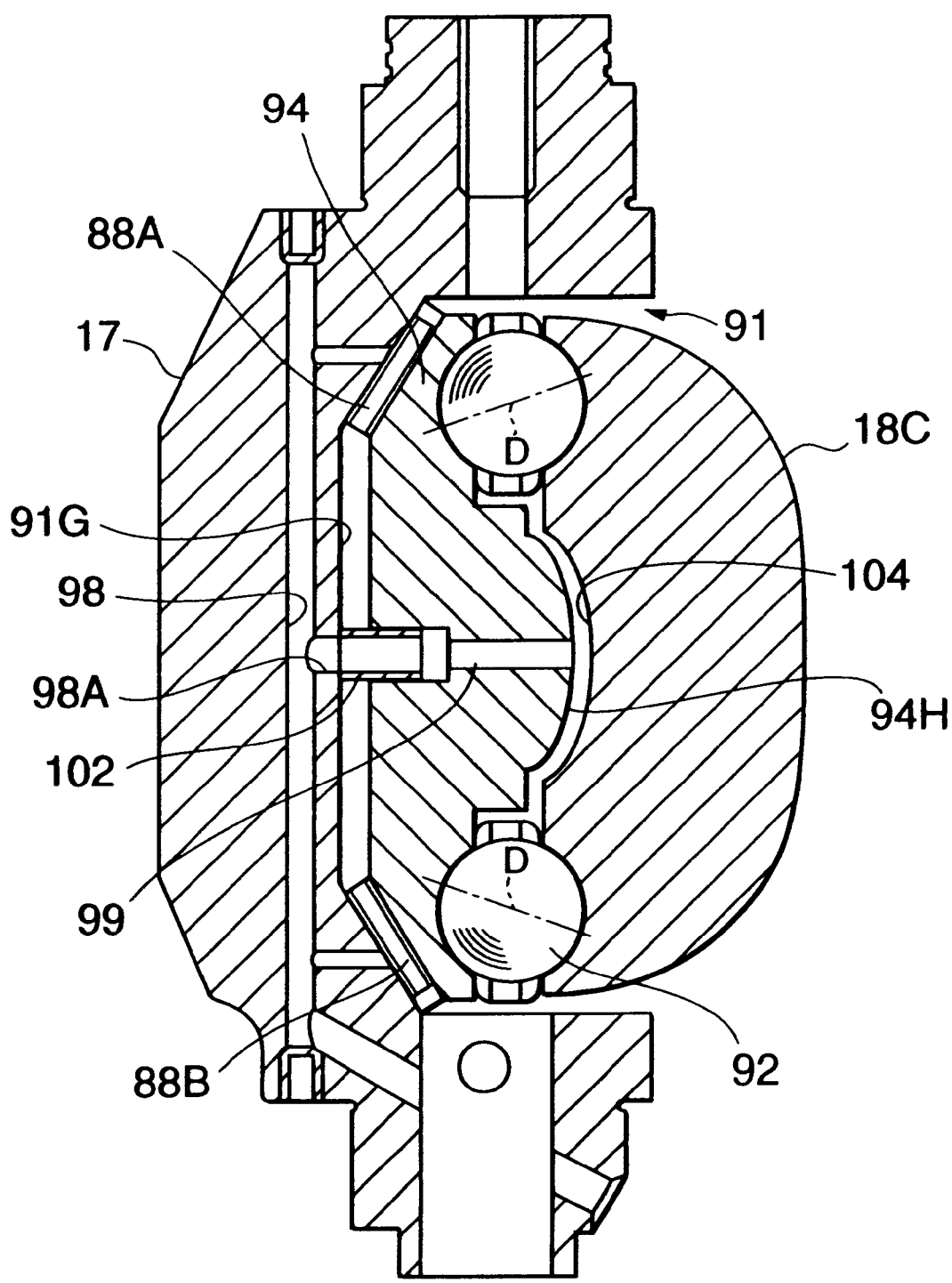
FIG. 13 is similar t o FIG. 10, but showing an eighth embodiment of this invention.

Next, an eighth embodiment of this invention will be described referring to FIG. 13.

According to this embodiment, instead of providing the reservoir as in the seventh embodiment, the center part 94H of the pedestal 94 has a spherical surface which projects toward the depression 104. The remaining features of the construction are identical to those of the seventh embodiment. By making the center part 94H project in this way, the rigidity of the pedestal 94 is improved.

Figure 14:
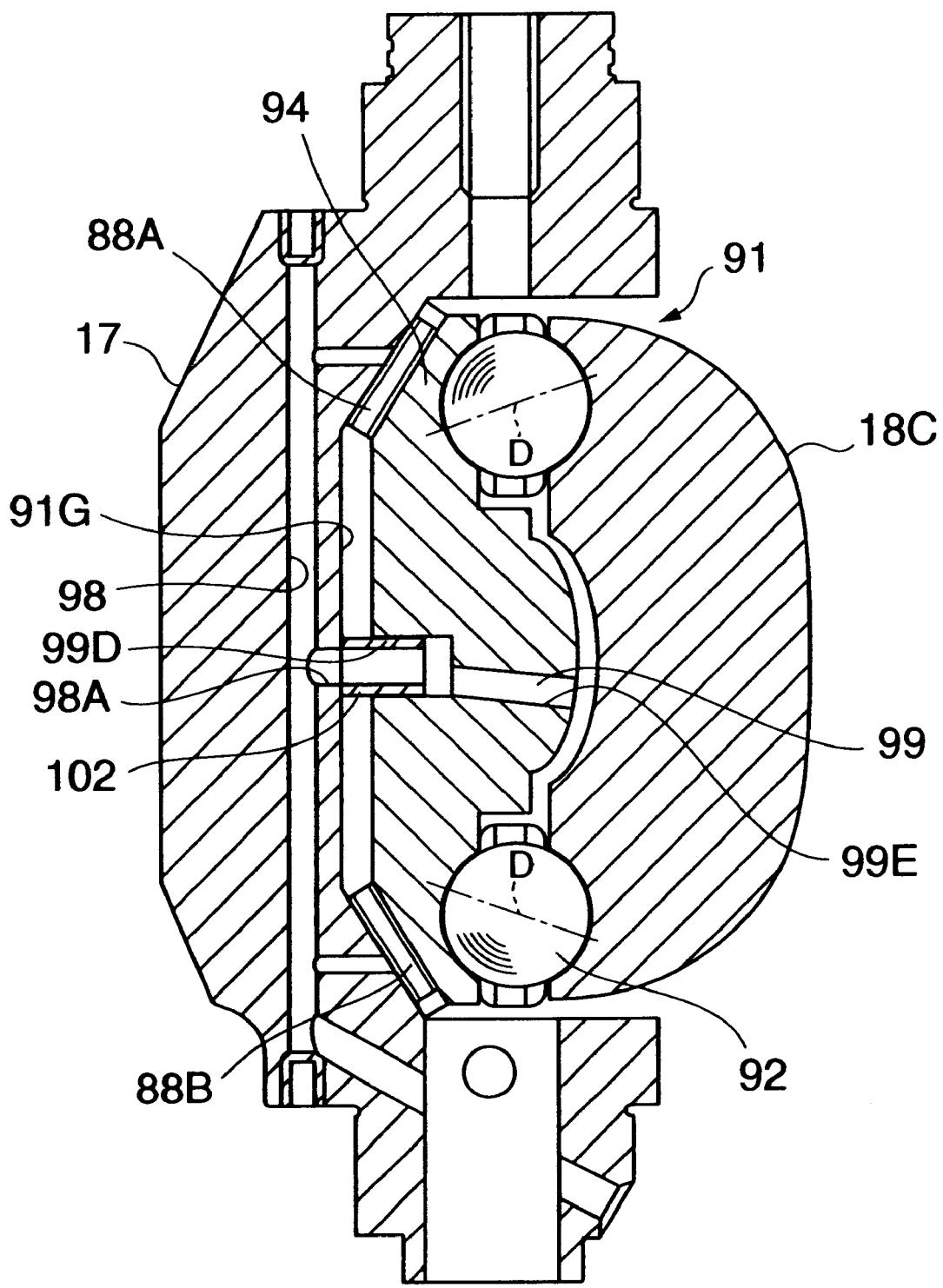
FIG. 14 is similar to FIG. 10, but showing a ninth embodiment of this invention.

Next, a ninth embodiment of this invention will be described referring to FIG. 14.

According to this embodiment, the oil passage 99 of the eighth embodiment is bent downwards midway along its length, and an outlet 99E facing the depression 104 of the oil passage 99 is formed at a lower position than an inlet 99D of the oil passage 99. The remaining features of the construction are identical to those of the seventh embodiment. By setting the outlet 99E lower than the inlet 99D of the oil passage 99, the flow of lubricating oil from the oil passage 99 to the ball bearing 92 is promoted by gravity when the lubricating oil pressure falls or when the lubricating oil viscosity increases.

Figure 15:
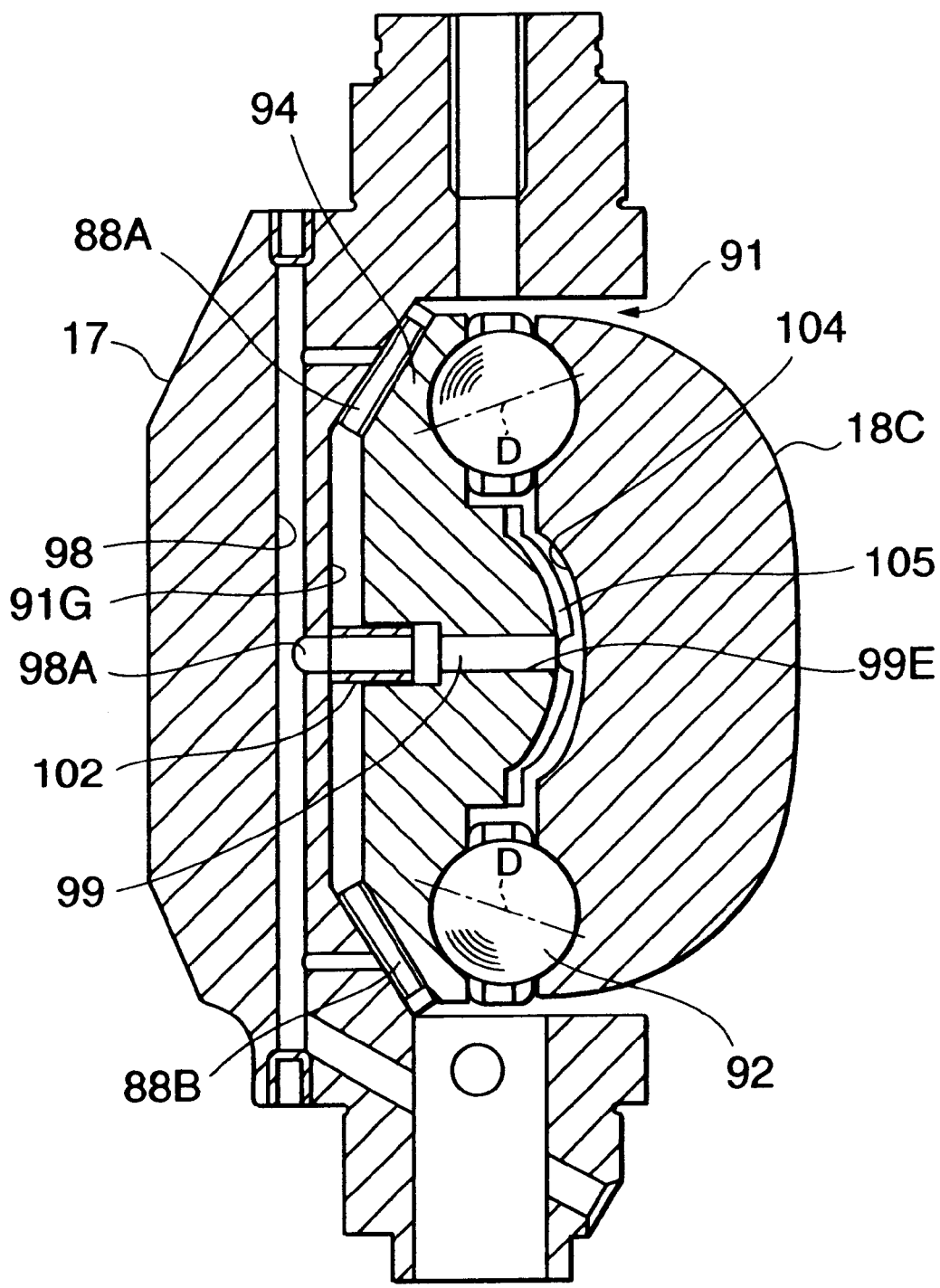
FIG. 15 is similar to FIG. 10, but showing a tenth embodiment of this invention.
Figure 16:
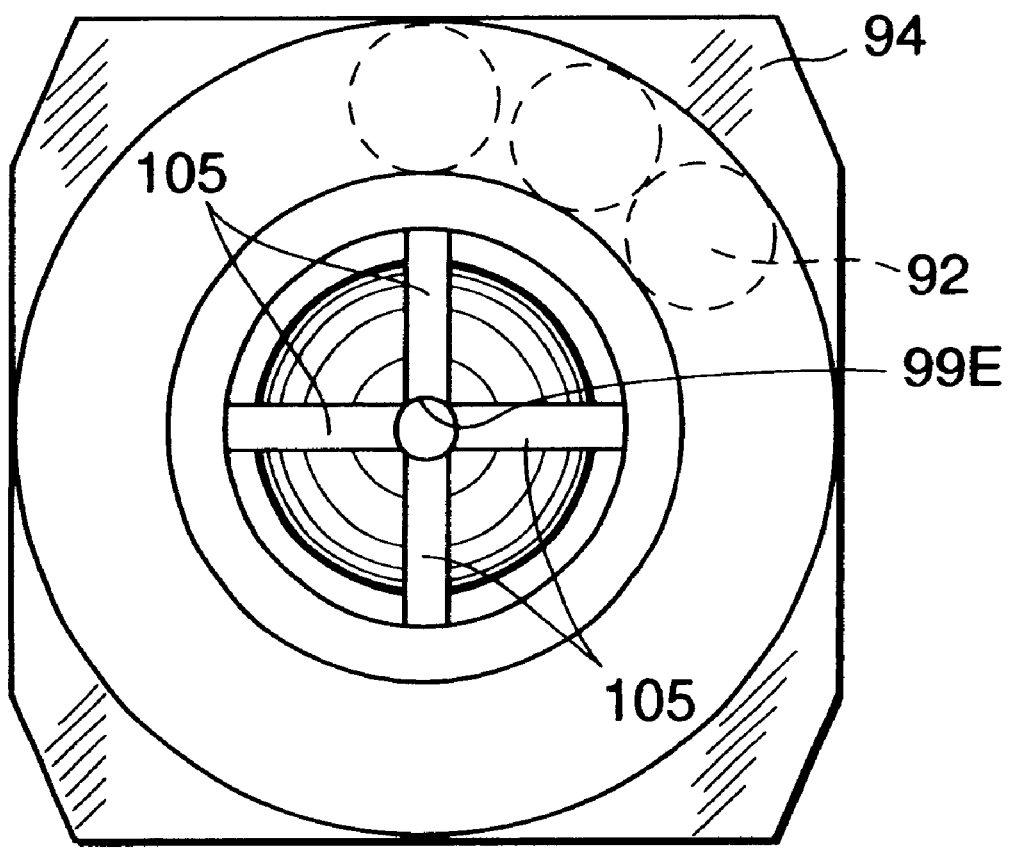
FIG. 16 is a front view of a lubricating oil guide groove according to the tenth embodiment.

Next, a tenth embodiment of this invention will be described referring to FIGS. 15 and 16.

In this embodiment, lubricating oil guide grooves 105 are further provided on the spherical surface of the center part 94H of the pedestal 94 of the eighth embodiment in order to promote distribution of lubricating oil to a specified part of the ball bearing 92. The lubricating oil guide grooves 105 are formed in a cross shape extending from the outlet of the oil passage 99, as shown in FIG. 16. The lubricating oil guide grooves 105 supply a particularly large amount of lubricating oil to parts of the ball bearing 92 corresponding to the vertical load acting on the power roller 18C when torque is transmitted, and the horizontal load acting on the power roller 18C when there is a gyration angle variation. The remaining features of the construction are identical to those of the eighth embodiment.

Figure 17:
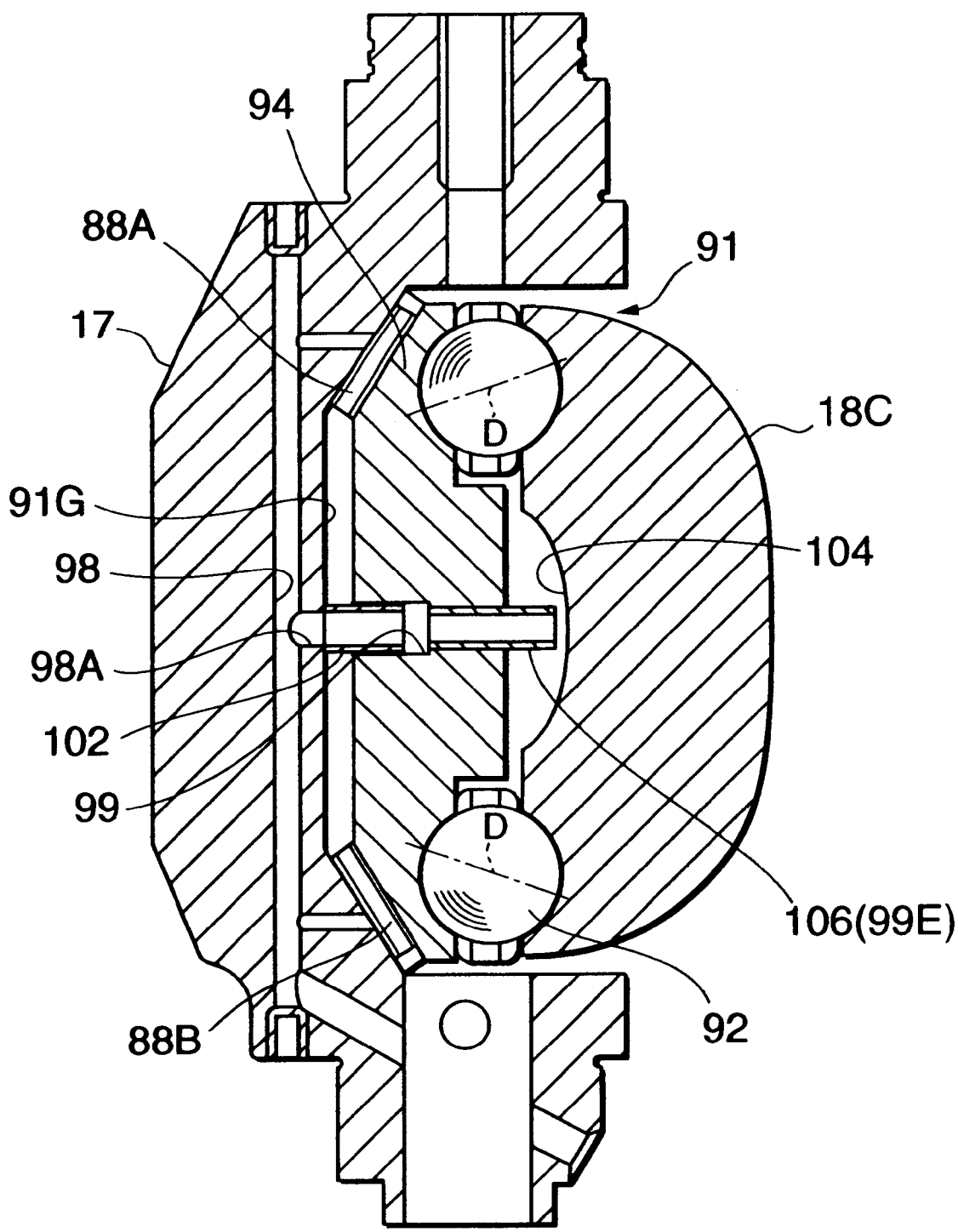
FIG. 17 is similar to FIG. 10, but showing an eleventh embodiment of this invention.

Next, an eleventh embodiment of this invention will be described referring to FIG. 17.

According to this embodiment, another sleeve 106 is engaged with the inner circumference of the oil passage 99 in the seventh embodiment, and one of its ends projects towards the oil reservoir towards the depression 104. The remaining features of the construction are identical to those of the seventh embodiment. Due to the sleeve which projects into the oil reservoir, lubricating oil in the oil passage 99 is supplied to the depression 104, and reaches the ball bearing 92 along the surface of the depression.

Next, a twelfth embodiment of this invention will be described referring to FIGS. 18A, 18B and 19.

This embodiment is a variation of the third embodiment or fourth embodiment. This embodiment differs from the third embodiment or fourth embodiment only in the construction of the connecting part between the opening 98A and oil passage 99. As shown in FIG. 18A, this embodiment comprises a sleeve 102 which projects toward the pedestal 94 from the opening 98A formed in the trunnion 17. As shown in FIG. 19, a depression 99A having an elliptical cross-section is formed in the inlet facing the trunnion 17 of the oil passage 99. The short axis of the ellipse is set slightly larger than the sleeve 102, and the long axis of the ellipse is set based on the range of horizontal displacement of the pedestal 94.

One end of the sleeve 102 is pressed into the inner circumference of the opening 98A of the trunnion, and the other end of the sleeve 102 enters the depression 99A. A branch passage 99B for supplying lubricating oil to the ball bearing 92 and a branch passage 99C for supplying lubricating oil to the roller bearing 89 are connected to the oil passage 99. The branch passage 99B and branch passage 99C are both formed in a radial direction inside the shaft 94A, and open to the outer circumference of the shaft 94A.

In this embodiment, when the pedestal 94 displaces in a horizontal direction relative to the trunnion 17 due to a horizontal load parallel to the input shaft 16 acting on the power roller 18C, the sleeve 102 also displaces in the horizontal direction inside the depression 99A. The lubricating oil is supplied to the oil passage 99 via the sleeve 102 which overlaps with the wall surface of the depression 99A, so not much oil flows into the gap between the trunnion 17 and pedestal 94, and sufficient lubricating oil can be supplied to the ball bearing 92 and roller bearing 89 which are constantly rotating under a large load. The supply of a large amount of lubricating oil to these parts also has a desirable effect on the cooling of the power roller 18C supported by these bearings.

Figures 18A, 18B:
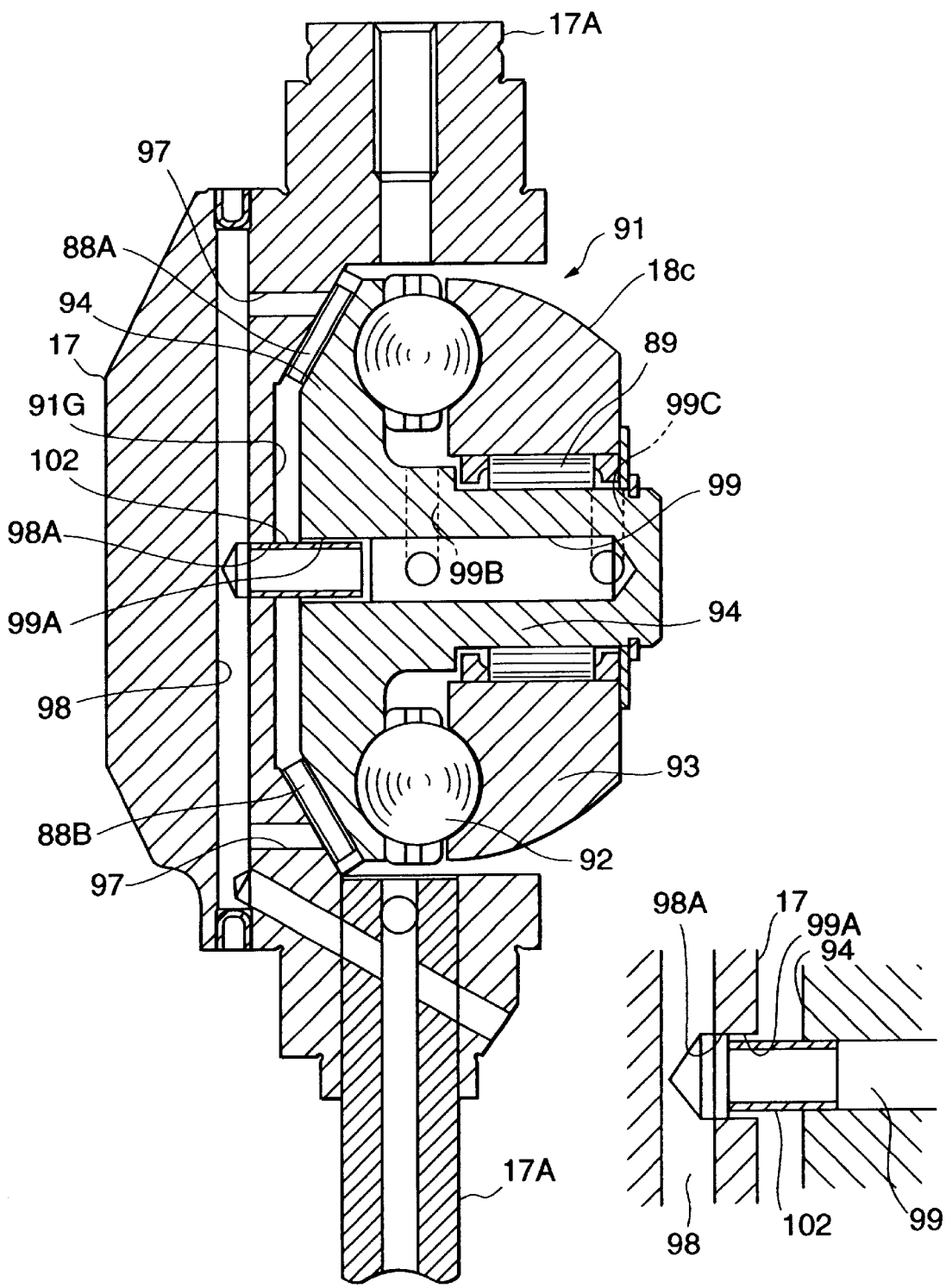
FIGS. 18A, 18B are enlarged longitudinal sectional views of the essential parts of a power roller and a trunnion according to a twelfth embodiment of this invention.
Figure 19:
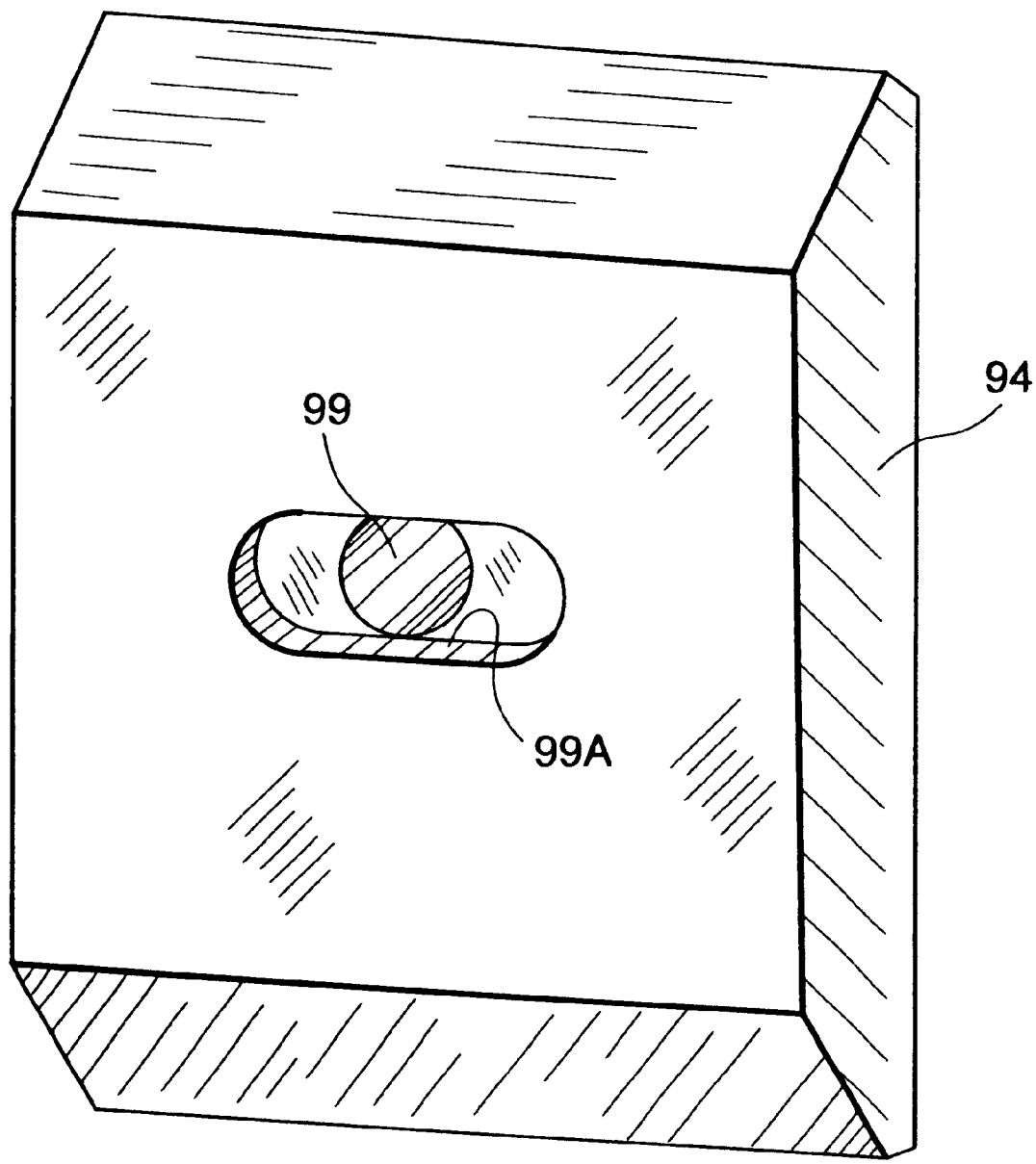
FIG. 19 is a perspective view of a pedestal according to the twelfth embodiment.

Instead of forming the depression 99A in the pedestal 94, the depression 99A which connects with the opening 98A may be formed in the trunnion 17, the sleeve 102 pressed into the oil passage 99 passing into the depression 99A, as shown in FIG. 18B, whereby exactly the same effect is obtained.

Figure 20:
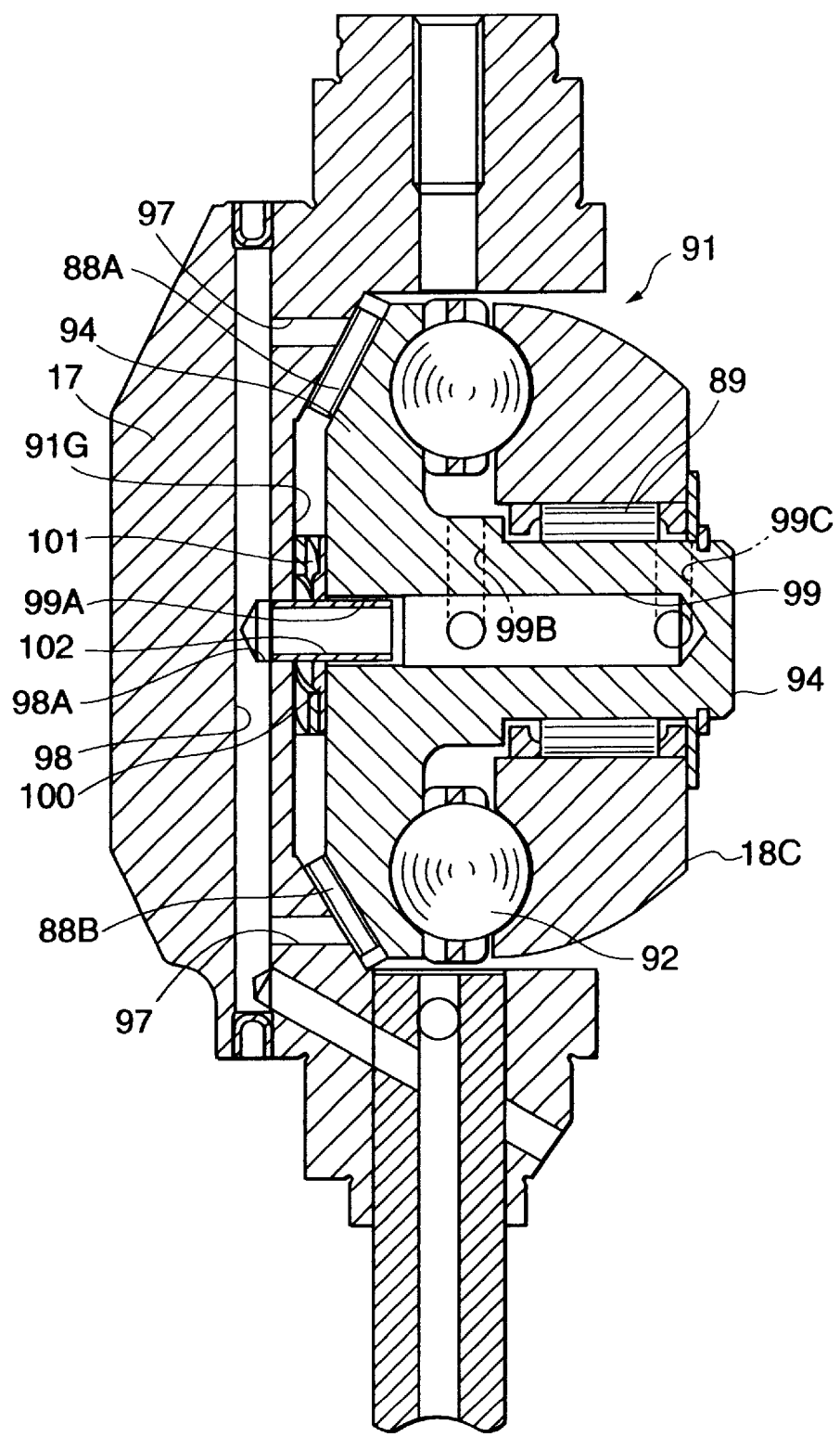
FIG. 20 is an enlarged longitudinal sectional view of the essential parts of a power roller and a trunnion according to a thirteenth embodiment of this invention.
Figure 21:
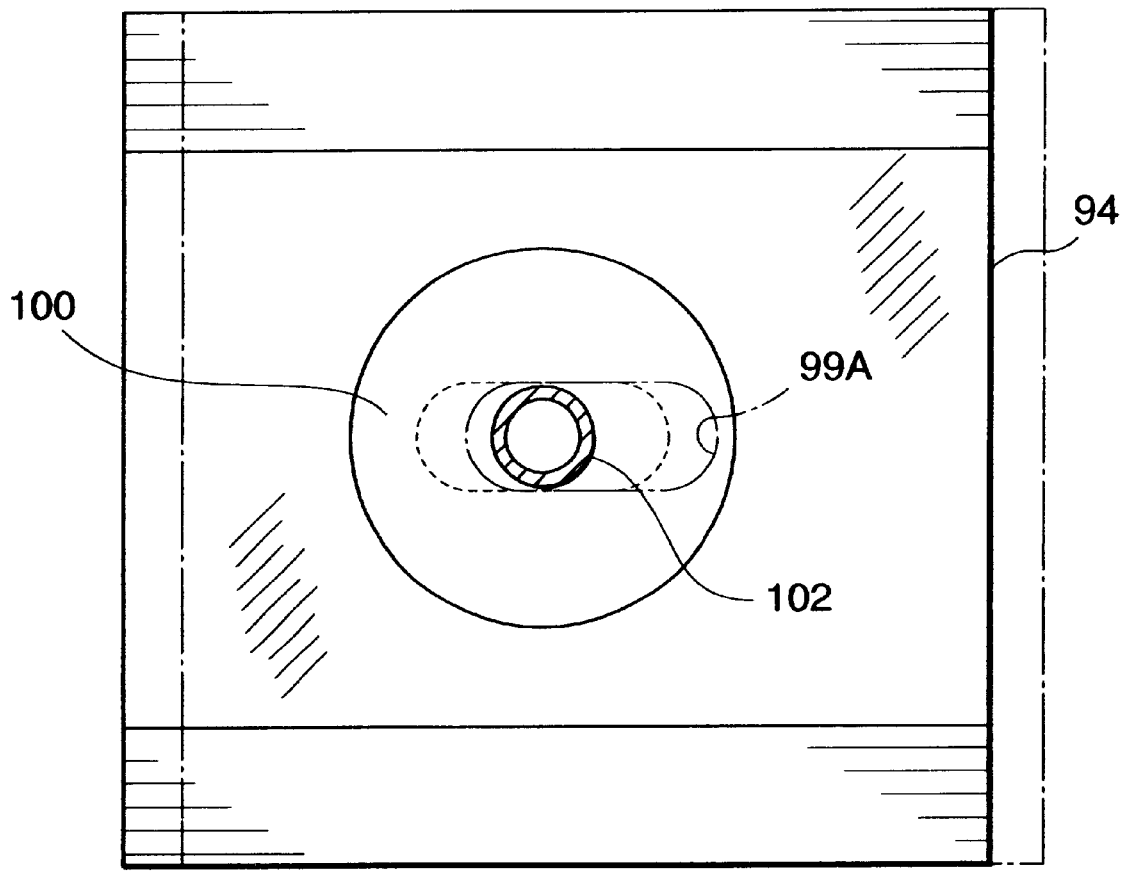
FIG. 21 is a rear view of a pedestal according to the thirteenth embodiment.

Next, a thirteenth embodiment of this invention will be described referring to FIGS. 20 and 21.

According to this embodiment, a cover 100 is added to the construction of the twelfth embodiment. The cover 100 is a disk-shaped member through the center of which the sleeve 102 passes. It covers the depression 99A as shown in FIG. 21, and it has a size sufficient to cover the depression 99A so that the depression 99A is not open to the gap between the trunnion 17 and pedestal 94 within the range of horizontal displacement of the pedestal 94. The cover 100 is pushed toward the pedestal 94 by a corrugated spring 101 supported by the trunnion 17, and is in close contact with the rear surface of the pedestal 94 as shown in FIG. 20.

According to this embodiment, of the lubricating oil supplied to the oil passage 99 from the connecting passage 98, the amount leaking into the gap between the trunnion 17 and pedestal 94 from the depression 99A can be further reduced.

Figures 22A, 22B:
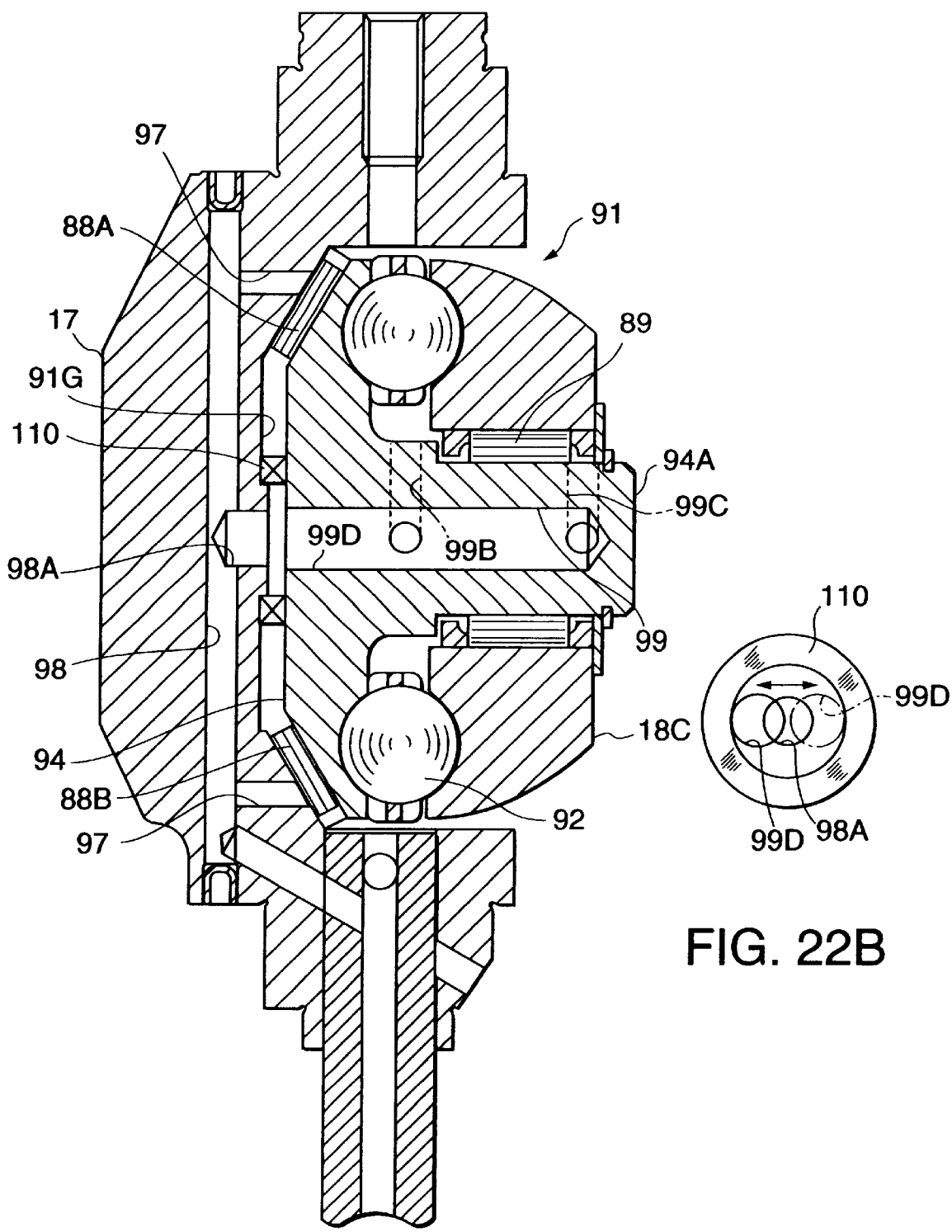
FIGS. 22A, 22B are an enlarged longitudinal sectional view of the essential parts of a power roller and a trunnion and a front view of an annular elastic seal, according to a fourteenth embodiment of this invention.

Next, a fourteenth embodiment of this invention will be described referring to FIGS. 22A and 22B.

This embodiment is a variation of the twelfth embodiment, and instead of the depression 99A and the sleeve 102 inserted in the depression 99A, an annular elastic seal 110 is gripped between the trunnion 17 and pedestal 94. The seal 110 is arranged so that it encloses the opening 98A and the inlet 99D of the oil passage 99 which are facing each other, and it has an inner diameter sufficient to accommodate the relative displacement between the opening 98A and inlet 99D. The remaining features of the construction are identical to those of the twelfth embodiment.

According also to this embodiment, of the lubricating oil supplied to the oil passage 99 from the passage 98, the amount leaking into the gap between the trunnion 17 and pedestal 94 from the depression 99A can be further reduced.

Figure 23:
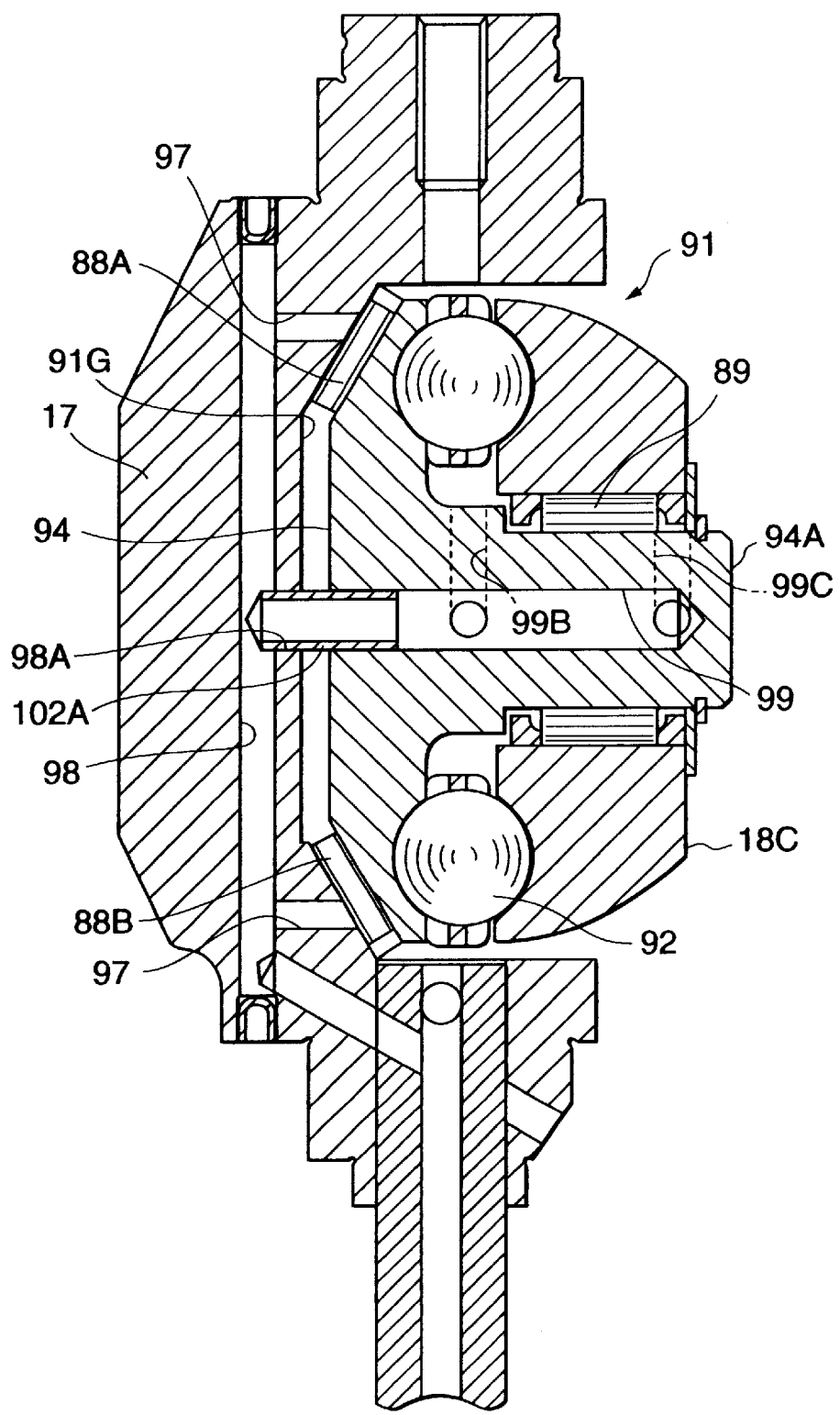
FIG. 23 is similar to FIG. 20, but showing a fifteenth embodiment of this invention.

Next, a fifteenth embodiment of this invention will be described referring to FIG. 23.

This embodiment is also a variation of the twelfth embodiment, a sleeve 102A comprised of an elastic member being used instead of forming the depression 99A. One end of the sleeve 102A engages with the inner circumference of the opening 98, and the other end engages with the inner circumference of the inlet 99D of the oil passage 99. The remaining features of the construction are identical to those of the twelfth embodiment.

According to this embodiment, due to the elastic deformation of the sleeve 102A instead of providing the depression, the relative displacement of the opening 98A and inlet 99D of the oil passage 99 is absorbed. As a result, according to this embodiment, leakage of lubricating oil supplied to the oil passage 99 from the passage 98 into the gap between the trunnion 17 and pedestal 94 from the depression 99A, can be completely prevented.

Also as there is no need to form a depression, machining of the parts of the CVT 10 is easier.

The contents of Tokugan Hei 11-123619, with a filing date of Apr. 30, 1999 in Japan, Tokugan Hei 11-358439 with a filing date of Dec. 17, 1999 in Japan, and Tokugan Hei 11-358438 with a filing date of Dec. 17, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A toroidal continuously variable transmission comprising:

an input shaft;

an input disk supported on the input shaft;

an output disk supported relative to the input disk on the input shaft;

a power roller gripped by the input disk and the output disk;

a pedestal which supports the power roller such that the power roller is free to rotate;

a trunnion;

a first roller bearing which supports the pedestal on the trunnion relative to a horizontal load which forms a right angle to the input shaft, and permits the pedestal to undergo a displacement parallel to the input shaft; and a second roller bearing which supports the pedestal on the trunnion relative to a vertical load which forms a right angle to the input shaft, and permits the pedestal to undergo a displacement parallel to the input shaft.

2. A toroidal continuously variable transmission as defined in claim 1, wherein the trunnion comprises a groove formed by a base, upper wall surface and lower wall surface, the first roller bearing is disposed between the pedestal and the base, and the second roller bearing comprises a first bearing unit disposed between the pedestal and the upper wall surface, and a second bearing unit disposed between the pedestal and the lower wall surface.

3. A toroidal continuously variable transmission as defined in claim 2, wherein a contact surface of the upper wall surface with the first bearing unit, and a contact surface of the lower wall surface with the second bearing unit are formed in a plane.

4. A toroidal continuously variable transmission comprising:

an input shaft;

an input disk supported on the input shaft;

an output disk supported relative to the input disk on the input shaft;

a power roller gripped by the input disk and the output disk;

a pedestal which supports the power roller such that the power roller is free to rotate;

a trunnion; and a roller bearing which supports the pedestal on the trunnion relative to a horizontal load which forms a right angle to the input shaft, and a vertical load which forms a right angle to the input shaft, and permits the pedestal to undergo a displacement parallel to the input shaft.

5. A toroidal continuously variable transmission as defined in claim 4, wherein the trunnion comprises a groove formed by the base, a first upper slant face, and a first lower slant face, the pedestal comprises a second upper slant face facing the first upper slant face, and a second lower slant face facing the first lower slant face, and the roller bearing comprises a bearing gripped by the first upper slant face and the second upper slant face, and a bearing gripped by the first lower slant face and the second lower slant face.

6. A toroidal continuously variable transmission as defined in claim 5, wherein the first upper slant face is a downward slanting surface formed above the base and the first lower slant face is an upward slanting surface formed below the base.

7. A toroidal continuously variable transmission as defined in claim 6, wherein the second upper slant surface and second lower slant surface respectively have a trapezoidal flat shape.

8. A toroidal continuously variable transmission as defined in claim 5, wherein the base comprises an upper base and lower base, the first upper slant surface is an upward slanting surface formed below the upper base, and the first slant surface is a downward slanting surface formed above the lower base.

9. A toroidal continuously variable transmission as defined in claim 5, wherein the continuously variable transmission further comprises a ball bearing interposed between the pedestal and the power roller, a lubricating oil supply passage formed inside the trunnion, an opening of the lubricating oil passage which opens toward the pedestal formed in the trunnion, a sleeve engaging with an inner circumference of the opening and projecting toward the pedestal, a depression having an elliptical cross-section formed in the pedestal which houses the sleeve, and an oil passage passing through the pedestal which connects the depression and the ball bearing.

10. A toroidal continuously variable transmission as defined in claim 9, wherein the continuously variable transmission further comprises a cover engaging with the outer circumference of the sleeve and covering the depression, and a pressing member supported by the trunnion which brings the cover into close contact with the pedestal.

11. A toroidal continuously variable transmission as defined in claim 5, wherein the continuously variable transmission further comprises a ball bearing interposed between the pedestal and the power roller, a lubricating oil supply passage formed inside the trunnion, an oil passage formed in the pedestal for supplying lubricating oil to the ball bearing, a sleeve engaging with an inner circumference of the oil passage and projecting toward the trunnion, and a depression having an elliptical cross-section formed in the trunnion which houses the sleeve.

12. A toroidal continuously variable transmission as defined in claim 5, wherein the continuously variable transmission further comprises a ball bearing interposed between the pedestal and the power roller, a lubricating oil supply passage formed inside the trunnion, the lubricating oil passage having an opening which opens toward the pedestal, an oil passage passing through the pedestal for supplying lubricating oil to the ball bearing, one end of the oil passage opening towards the opening, and an annular elastic seal interposed between the trunnion and pedestal forming a sealtight passage from the opening to the oil passage.

13. A toroidal continuously variable transmission as defined in claim 5, wherein the continuously variable transmission further comprises a ball bearing interposed between the pedestal and the power roller, a lubricating oil supply passage formed inside the trunnion, the lubricating oil passage having an opening which opens toward the pedestal, an oil passage formed in the pedestal for supplying lubricating oil to the ball bearing, and a sleeve formed of an elastic member which connects the opening and oil passage.

14. A toroidal continuously variable transmission as defined in claim 5, wherein the continuously variable transmission further comprises a ball bearing interposed between the pedestal and the power roller, a lubricating oil supply passage formed inside the trunnion, the lubricating oil passage having an opening which opens towards the pedestal, an oil passage formed in the pedestal for supplying lubricating oil to the ball bearing, and a sleeve engaging with the inner circumference of the oil passage and projecting towards the opening.

15. A toroidal continuously variable transmission as defined in claim 5, wherein the continuously variable transmission further comprises a ball bearing interposed between the pedestal and the power roller, wherein the ball bearing comprises a first annular groove formed in the pedestal, a second annular groove formed in the power roller facing the first annular groove, and plural spheres interposed between the first annular groove and the second annular groove, and the radius of a locus of the contact point of the first annular groove and the spheres is set to be less than the radius of a locus of the contact point between the second annular groove and the spheres.

16. A toroidal continuously variable transmission as defined in claim 15, wherein the continuously variable transmission further comprises a lubricating oil supply passage formed inside the trunnion, the lubricating oil supply passage comprising an opening which opens toward the pedestal, a lubricating oil passage passing through the pedestal into a space formed by the pedestal, the power roller, and the ball bearing, the oil passage comprising an inlet facing the opening and an outlet facing the space, and a depression formed in the power roller facing the space to accumulate lubricating oil supplied to the ball bearing via the space.

17. A toroidal continuously variable transmission as defined in claim 16, wherein the outlet of the oil passage is disposed at a lower position than the inlet.

18. A toroidal continuously variable transmission as defined in claim 16, wherein the pedestal further comprises a spherical projection facing the space.

19. A toroidal continuously variable transmission as defined in claim 18, wherein the projection comprises a lubricating oil guide groove for guiding lubricating oil from the outlet to the ball bearing.

20. A toroidal continuously variable transmission as defined in claim 16, wherein the outlet comprises a sleeve engaged with an inner circumference of the oil passage and projecting towards the space.

* * * * *